United States Patent
Wigren

(10) Patent No.: US 9,124,367 B2
(45) Date of Patent: *Sep. 1, 2015

(54) METHODS AND ARRANGEMENTS FOR MEMORY-EFFICIENT ESTIMATION OF NOISE FLOOR

(75) Inventor: Torbjörn Wigren, Uppsala (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 1059 days.

This patent is subject to a terminal disclaimer.

(21) Appl. No.: 12/922,745

(22) PCT Filed: Mar. 18, 2008

(86) PCT No.: PCT/SE2008/050303
§ 371 (c)(1),
(2), (4) Date: Sep. 15, 2010

(87) PCT Pub. No.: WO2009/116905
PCT Pub. Date: Sep. 24, 2009

(65) Prior Publication Data
US 2011/0021222 A1  Jan. 27, 2011

(51) Int. Cl.
*H04B 15/00* (2006.01)
*H04B 17/373* (2015.01)
*H04B 17/309* (2015.01)
*H04B 17/318* (2015.01)
(Continued)

(52) U.S. Cl.
CPC ............ *H04B 17/373* (2015.01); *H04B 17/309* (2015.01); *H04B 17/318* (2015.01); *H04B 17/345* (2015.01); *H04B 17/354* (2015.01)

(58) Field of Classification Search
CPC ............ H04B 17/005; H04B 17/0042; H04B 17/0052; H04B 17/0057; H04B 17/0075
See application file for complete search history.

(56) References Cited

U.S. PATENT DOCUMENTS

2001/0055952 A1* 12/2001 Ficarra .................... 455/67.3
2007/0127588 A1*  6/2007 Kim ......................... 375/267
(Continued)

FOREIGN PATENT DOCUMENTS

EP        1 555 761 A1    7/2005
WO    2004/034615 A1    4/2004
(Continued)

OTHER PUBLICATIONS

PCT International Search Report, mailed Jan. 14, 2009, in connection with International Application No. PCT/SE2008/050303.

*Primary Examiner* — Fanghwa Wang
(74) *Attorney, Agent, or Firm* — Patent Portfolio Builders PLLC

(57) ABSTRACT

The present invention relates to a method and arrangement in a wireless communication system, e.g. an evolved UMTS Terrestrial Radio Access Network, for improved scheduling and admission control of the uplink by providing an improved determining of power-related quantities, e.g. neighbor cell interference levels, for specific tones and providing more accurate recursive estimation of noise-related quantities, e.g. noise floor power estimates, for specific tones. The method and arrangement obtains a neighbor cell interference measure for each subset of tones from at least a noise floor measure for each subset of tones based on combined power quantities from the total uplink power per subset of tones and dividing said noise floor measure into sub noise floor measures for each subset of tones, said dividing dependent on the bandwidth of each subset of tones.

9 Claims, 10 Drawing Sheets

(51) Int. Cl.
*H04B 17/345* (2015.01)
*H04B 17/354* (2015.01)

(56) References Cited

U.S. PATENT DOCUMENTS

2007/0202826 A1* 8/2007 Dean .............................. 455/230
2008/0198802 A1* 8/2008 Zhang et al. .................. 370/329
2008/0227400 A1* 9/2008 Wigren ...................... 455/67.13

FOREIGN PATENT DOCUMENTS

| WO | 2007/021159 A2 | 2/2007 |
| WO | 2007/024166 A1 | 3/2007 |
| WO | 2008/004924 A1 | 1/2008 |

* cited by examiner

US 9,124,367 B2

METHODS AND ARRANGEMENTS FOR MEMORY-EFFICIENT ESTIMATION OF NOISE FLOOR

TECHNICAL FIELD

The present invention relates in general to methods and devices for estimation of power-related quantities in cellular communications systems, and in particular for estimation of noise floor.

BACKGROUND

Long Term Evolution (LTE) telecommunication systems are an evolution of Wideband Code Division Multiple Access (WCDMA) telecommunication systems introducing a new air interface. LTE has many attractive properties that can be used for future development of telecommunication services. A specific technical challenge in, e.g., LTE and similar systems is the scheduling of uplink channels to time intervals and frequencies where the interference conditions are favourable, and where there exist a sufficient capacity in the uplink. This can be done since different users in LTE are allocated to different sub-bands (also called tones) during each timeslot. Due to leakage between the sub-bands other existing users of the cell all contribute to the interference level of a specific user in the uplink of LTE systems. Further, terminals in neighbour cells also contribute to the same interference level. This is because all users and common channels of all cells transmit in the same uplink frequency band when LTE technology is used. Thus, users of neighbour cells that transmit on the same tones as users in the own cell will produce interference. Two sources of interference are present—from users in the own cell and from users of neighbour cells.

In order to schedule the traffic in the own and neighbour cells efficiently, it is desirable to know the level of interference for each tone of the uplink. With such knowledge it becomes possible to schedule traffic to free tones where the interference level is low. In that way the transmission from the terminal (UE) to the base station (eNodeB) will be efficient. Reversing the argumentation, it is clear that scheduling to tones with a high interference level should be avoided, because such scheduling interferes with ongoing uplink transmission in neighbour cells.

As discussed above, the interference power at a specific tone is the sum of the interference from neighbour cells and the leakage power from the other tones of the own cell. Now, the leakage from other tones of the own cell depends in a known way on the selected filter bank. Hence, knowledge of the total power levels of the received signals of the uplink of the own cell can be used to compute the expected leakage power, that affects a specific tone. Consequently, it is possible to filter out, at least to some extent, the own cell interference. This leaves the neighbour cell interference as the major source of interference for each tone of the own cell.

The interference level of a specific tone of a cell in, e.g., an LTE system is usually expressed with respect to some reference, typically the thermal noise power floor. It is thus necessary to determine the noise power floor in order to determine the interference level. Determinations of noise floor have in the past typically been associated with relatively large uncertainties, often of a size of several dBs. This is an effect of unknown scale factor errors of the front end receiver electronics. Prior art solutions for estimation of the noise floor, e.g. the international PCT-applications WO 2007/024166 and WO 2008/004924, describe means for noise floor estimation that are suitable for code division multiple access communications systems. They do, however, not disclose any means suitable for estimation of the noise floor for single tones of the LTE uplink. Neither do they address LTE-specific problems, e.g. relating to the filtering of leakage between tones of the own cell, which is a consequence of the uplink multiple access method used in LTE and different from the one used in code division multiple access systems. Finally, they do not address the estimation of the neighbour interference level of specific tones of the LTE uplink, exploiting a (possibly uncertain) estimate of the thermal noise power floor of said specific tones, Therefore, there is a need for methods and arrangements for providing efficient and accurate real time estimates of the thermal noise power floor and the neighbour cell interference level, applicable to the LTE uplink multiple access method.

The admission of new users into the LTE telecommunication system provides a way to regulate the load of LTE cells and may be performed either in the eNodeBs or in another node. The admission rules may typically use information on the total power level of the cell, the own channel power of the cell, the neighbour cell interference level of the cell, as well as information on the thermal noise power floor of the cell. Therefore there is a need for methods and arrangements for aggregating, for each of the subsets of frequency sub-bands of the total LTE frequency band, the total power, own channel power, and neighbour cell interference power to obtain the total cell power, the total own cell channel power, and the total neighbour cell interference level. Furthermore, there is a need for means providing signaling of a subset of the total cell power, the total own cell channel power, the total neighbour cell interference level, and the thermal noise floor measure to an external node, or another function within the e Node B.

Also, the memory consumption associated with the estimation of the thermal noise power flow in an LTE-system may in previously known systems require a too high amount of memory, e.g. about 10-100 MByte of memory, which is not acceptable for an ASIC-implementation.

A general problem with prior art LTE communications networks is that neighbour cell interference estimations are presented with an accuracy that makes careful scheduling of uplink traffic difficult. In particular, the determination of neighbour cell interference suffers from significant uncertainties, primarily caused by difficulties to estimate the noise floor.

SUMMARY

It is a general object of the present invention to achieve improved methods and arrangements with low requirements on memory for accurate determinations of power-related quantities, e.g. neighbour cell interference levels, for specific tones of the LTE uplink.

It is another object of the present invention is to provide methods and arrangements for more accurate determination of noise related quantities, e.g. noise floor power estimates, for specific tones of the LTE uplink.

These and other objects are achieved in accordance with the attached set of claims.

According to one aspect, the present invention comprises a method for noise floor power estimation from a sequence of power quantities, possibly combined from power quantities related to each of a number of frequency sub-bands. Said method includes the steps of estimating a noise floor power measure, typically represented by a conditional probability distribution, for the complete frequency band; and thereafter estimating sub noise floor power measures for each frequency sub-band, said sub noise floor measures typically represented by conditional probability distributions, accounting for the bandwidth of each frequency sub-band and resulting in values of said conditional probability distributions on pre-selected power grids.

From the measured samples of at least the total uplink power, a probability distribution for a first power quantity is estimated. Typically, this first power quantity is the total uplink power itself. The probability distribution for the first power quantity is used for calculating a conditional probability distribution of a noise floor measure. This calculating is performed recursively thereby reducing memory requirements of the algorithm to negligible levels. A value of a noise rise measure is finally calculated based on the conditional probability distribution for the noise floor measure.

Embodiments of the present invention include
said sequence of power quantities consisting of a sequence of total powers of one or more of the subsets of frequency sub-bands;
said sequence of power quantities consisting of a sequence of total powers of each subset of frequency sub-bands as well as a sequence of own cell signal powers related to one or more of the subsets of frequency sub-bands;
said sequence of power quantities consisting of a sequence of total powers of each subset of frequency sub-bands, as well as a sequence of own cell signal powers related to one or more of the subsets of frequency sub-bands, said sequence of own cell signal powers being removed from said total powers of each subset of frequency sub-bands by application of a filtering operation for obtaining a residual power measure related to remaining neighbour cell interference power; said residual power measure being represented by a probability distribution on a discretized residual power grid.

According to another aspect, the present invention comprises a method of neighbour cell interference estimation from said conditional probability distribution representing the noise power floor measures for said subsets of frequency sub-bands, representing from said probability distributions the residual power measures, and calculating a probability distribution representing the neighbour cell interference on a pre-selected interference grid.

A further aspect of the present invention comprises means for calculating of optimal estimates and optimal variance estimates of neighbour cell interference powers and noise power floors for said subsets of frequency sub-bands; said optimal estimates and optimal variance estimates calculated as conditional means exploiting the estimated conditional probability distribution of the neighbour cell interference powers and the thermal noise power floors for said subsets of frequency sub-bands.

Yet a further aspect of the invention relates to a node, typically a eNodeB, in a wireless communications system comprising means for obtaining measured samples of at least the total uplink power and means for estimating a probability distribution for a first power quantity from at least the measured samples of at least total uplink power. The node further comprises means, operating in a recursive manner, for recursively calculating a conditional probability distribution of a noise floor measure based on at least said probability distribution for a first power quantity. The node also comprises means for calculating a value of the noise rise measure based on the conditional probability distribution for the noise floor measure.

One advantage of the present invention is that an accurate noise rise value can be provided, even in the presence of neighbour cell interference, external interference sources, and rapidly fluctuating powers. Furthermore, the present invention has a comparatively low computational complexity and memory requirements.

An important advantage is that the algorithm according to the present invention lends itself to ASIC implementation due to the fact that it operates as a recursive filter with no need for dynamic memory allocation. This fact makes the proposed algorithm suitable for a replacement of a sliding window based algorithm.

Further advantages are discussed in connection with the detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

In the present disclosure, complements to different distribution functions are discussed. The complement to a cumulative distribution function F is thereby defined as one minus the cumulative distribution function F. In the case of, e.g., a cumulative error distribution function $F_{\Delta x(t'|t')}(x-\hat{x}_{P^{Total}}^{Kalman}(t'|t'))$ (defined further below), the complement of the cumulative error distribution function becomes $1-F_{\Delta x(t'|t')}(x-\hat{x}_{P^{Total}}^{Kalman}(t'|t'))$.

Figure 1:
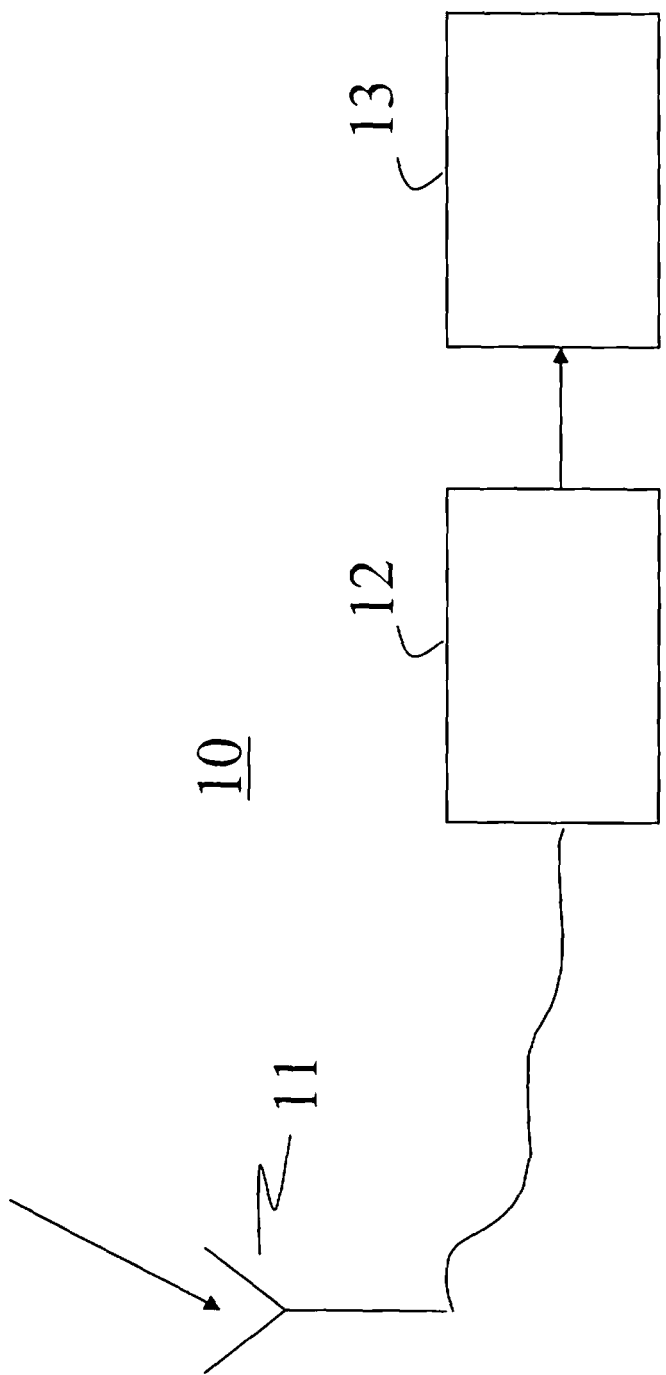
FIG. 1 shows a signal chain of an eNode B performing neighbour cell interference estimation.

Reference and Measurement Points:

In a typical signal chain of a eNodeB 10, cf. FIG. 1, a received wideband signal from an antenna 11 first passes an analogue signal conditioning chain 12, which consists of cables, filters etc. Variations among components, together with temperature drift, render the scale factor of this part of the system to be undetermined with up to ±2 dB, when the signal enters a receiver. This is discussed further below. In the receiver 13, a number of operations take place. For interference estimation it is normally assumed that a total received power is measured at some stage. Hereby, a major problem is how to use this and other pieces of information to estimate the thermal noise power.

There are several reasons for the difficulties to estimate the thermal noise floor power. One reason, as indicated above, is that the thermal noise floor power, as well as the other received powers, is affected by component uncertainties in the analogue receiver front end 12. The signal reference points are, by definition, at the antenna connector 11. The measurements are however obtained after the analogue signal conditioning chain 12, in the digital receiver 13. The above mentioned uncertainties also possess a thermal drift.

The analogue signal conditioning electronics chain 12 does introduce a scale factor error of about ±2 dB between radio base stations (batch) that is difficult to compensate for. Any power measurement that is divided by the default value of the thermal noise power floor may therefore be inconsistent with the assumed thermal noise power floor by ±2 dB. This results in an interference estimate that is also wrong by ±2 dB. Considering the fact that the neighbour cell interference levels in LTE system are of the same order, it is clear that an error of +/−2 dB is not acceptable. All powers are approximately equally affected by the scale factor error $\gamma(t)$. Thus, when the interference ratios $I_R(t)$ are calculated, the scale factor error is cancelled as $$I_R(t) = \frac{P^{Digital\ Receiver}(t)}{P_N^{Digital\ Receiver}} = \frac{\gamma(t)P^{Antenna}(t)}{\gamma(t)P_N^{Antenna}} = I_R^{Antenna}(t) \quad (1)$$

where $I_R^{DigitalReceiver}(t)$ and $I_R^{Antenna}(t)$ are the interference ratios as measured at the digital receiver and at the antenna, respectively; $P^{DigitalReceiver}(t)$ and $P^{Antenna}(t)$ are received powers at the digital receiver and the antenna, respectively; and $P_N^{DigitalReceiver}$ and $P_N^{Antenna}$ are the thermal noise level as measured at the digital receiver and the antenna, respectively. However, equation (1) requires a measurement of the noise floor $P_N^{DigitalReceiver}$ digital receiver. As will be clear later, estimation of the absolute value of the neighbour cell interference also requires a prior thermal noise floor estimation step.

Figure 5:
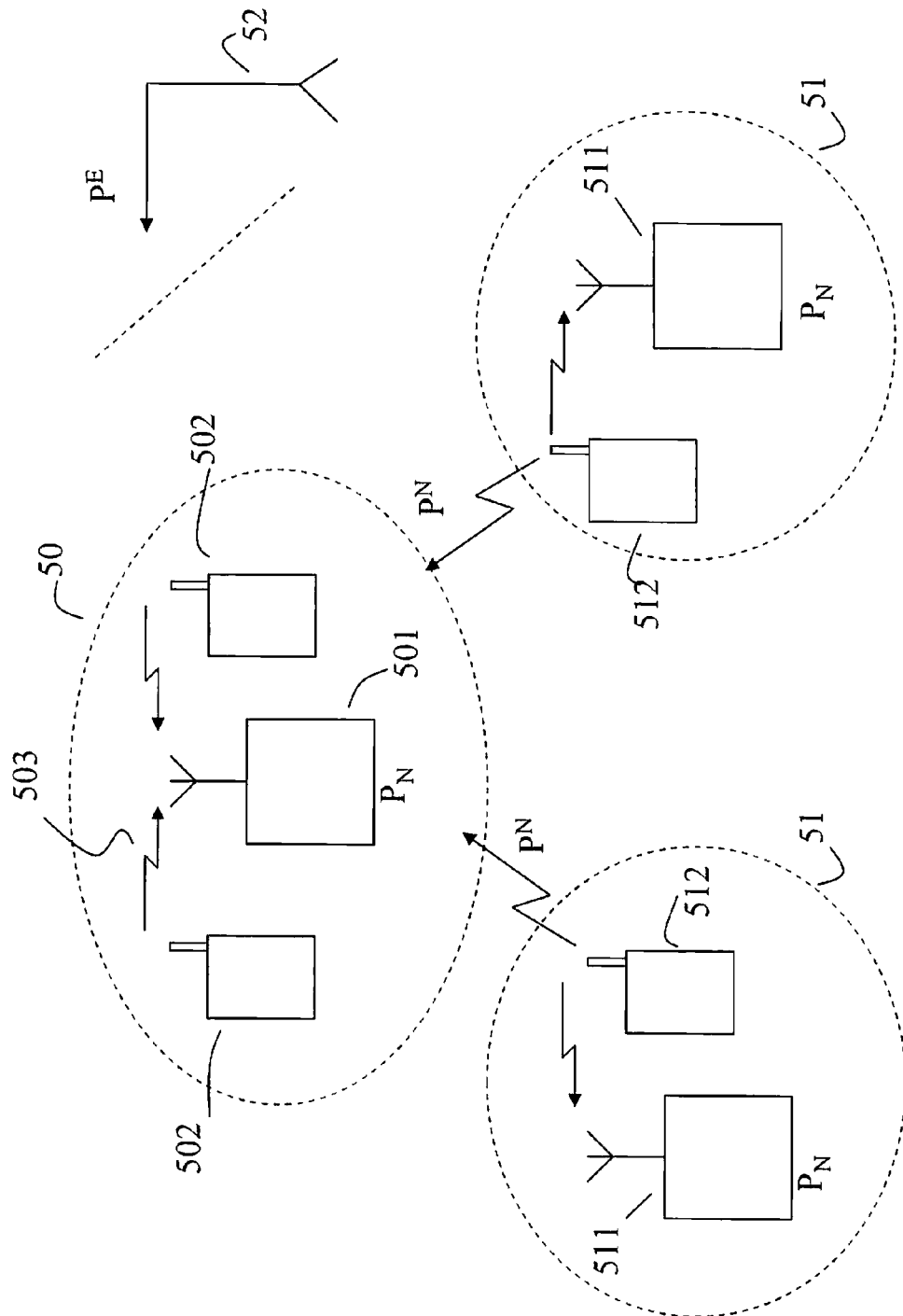
FIG. 5 illustrates signal powers occurring in a typical cellular mobile communication system.

FIG. 5 illustrates the contributions to power measurements in connection with a radio base station 501. The radio base station, e.g. an eNodeB in an E-UTRAN, is associated with a cell 50 within which a number of mobile terminals 502 are present communicating with the radio base station 501 over various links 503, each contributing to the total received power. The cell 50 has a number of neighbouring cells 51 within the same mobile communication system, each of which associated with a radio base station 511 and comprising mobile terminals 512. The mobile terminals 512 emit radio frequency power whereby the sum of all such contributions from a neighbouring cell is denoted $P^N$. There may also be other network external sources of radiation such as, e.g., a radar station 52. Contributions from such sources are denoted $P^E$. Finally, the term $P_N$ arises from the receiver itself.

Observability of the Noise Floor:

One reason for the difficulties to estimate the thermal noise floor power now appears, since even if all measurements are made in the digital receiver, the noise floor cannot be directly measured, at least not in a single e Node B. The explanation is that neighbour cell interference and interference from external sources also affect the tones in the receiver, and any mean value of such sources cannot be separated from the noise floor. Power measurements in the own cell channels can improve the situation but do, however, not solve the entire problem. On top of the above, power leakage from adjacent tones can add to the interference, particularly in cases with sampling and frequency errors.

Figure 2:
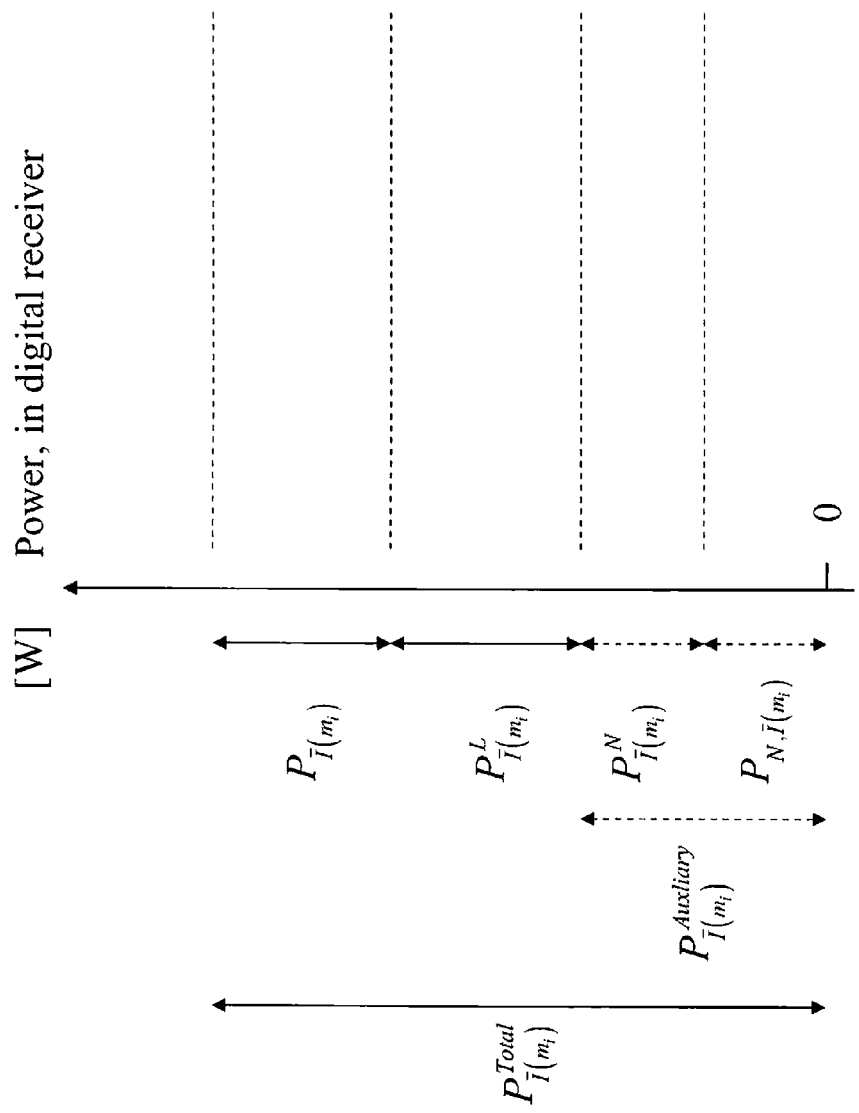
FIG. 2 is a schematic illustration of signal powers occurring in a typical LTE system in which the present invention can be implemented.

FIG. 2 illustrates various contributions to power measurements in connection with an arbitrary eNodeB 501 in a wireless communication system, e.g. as illustrated in FIG. 5. In FIG. 2, solid arrows indicate measurable quantities while dashed arrows indicate non-measurable quantities. The eNodeB 501 is associated with a cell 50. Within the cell 50 a number of mobile terminals 502 are present, which communicate with the eNodeB 501 over different links, each contributing to the total received power in a sub-set of tones, to which the terminal is allocated. This power is denoted $P_{\bar{I}(m_i)}(t)$, where m, =1, . . . , M denotes the terminal number and $\bar{I}(m_i)$ the subset of numbers of tones used by one terminal in time slot t. $f_{\bar{I}(m_i)}$ denotes the corresponding frequencies of the tones. The cell 50 has a number of neighbouring cells 51 within the same LTE system, each associated with a respective eNodeB 511 and comprising mobile terminals 512 emitting radio frequency powers whereby the sum of all contributions of emitted radio frequency powers of said mobile terminals 512 is denoted by $P_{\bar{I}(m_i)}^N$. There may also be leakage power from adjacent tones, denoted $P_{\neg\bar{I}(m_i)}^L$. Here $\neg\bar{I}(m_i)$ denote tone numbers that are not in $\bar{I}(m_i)$. Finally, the thermal noise $P_{N,\bar{I}(m_i)}$ of the frequency sub-bands $f_{\bar{I}(m_i)}$ arises from the receiver itself. It should be noted that $P_{N,\bar{I}(m_i)}$ is not the same as the thermal noise floor for the whole uplink frequency band.

It is clear from the above that at least $P_{\bar{I}(m_i)}^N$ and $P_{N,\bar{I}(m_i)}$ are not measurable and hence need to be estimated. Sometimes $P_{\neg\bar{I}(m_i)}^L$ can be estimated from measurements of own cell powers of other users in the same cell—this is described further below. The total power measurement in the sub-set of tones, $P_{\bar{I}(m_i)}^{Total}(t)$, can be expressed according to:

$$P_{\bar{I}(m_i)}^{Total}(t) = P_{\bar{I}(m_i)}(t) + P_{\bar{I}(m_i)}^N(t) + P_{\bar{I}(m_i)}^L(t) + P_{N,\bar{I}(m_i)} + e_{\bar{I}(m_i)}(t) \quad (2)$$

where $e_{\bar{I}(m_i)}(t)$ models measurements noise.

It can be mathematically proven that a linear estimation of $P_{\bar{I}(m_i)}^N$ and $P_{N,\bar{I}(m_i)}$ is not an observable problem. Only the quantity $P_{\bar{I}(m_i)}^N + P_{N,\bar{I}(m_i)}$ is observable from available measurements, provided that $P_{\neg\bar{I}(m_i)}^L$ is measured. Otherwise only $P_{\bar{I}(m_i)}^N + P_{N,\bar{I}(m_i)} + P_{\neg\bar{I}(m)}^L$ is observable but there is no conventional technique that can be used to separate the thermal noise power floor from power mean values originating from neighbour cell interference and other in-band interference sources.

Noise Floor Estimation:

A possible solution to achieve noise floor estimation is to use an individual determination of the thermal noise floor for each radio base station in the field in order to achieve a high enough neighbour cell interference estimation performance. The establishment of the default value for the thermal noise power floor, as seen in the digital receiver, requires reference measurements performed over a large number of radio base stations either in the factory or in the field. Both alternatives are costly and need to be repeated as soon as the hardware changes. The above approach to solve the problem would require calibration of each eNodeB individually. This would however be very costly and is extremely unattractive. Furthermore, temperature drift errors in the analogue signal conditioning electronics of perhaps 0.3-0.5 dB would still remain.

Another potential approach would be to provide an estimation of the thermal noise power floor. One principle for estimation of the thermal noise power floor is to estimate it as a minimum of a measured or estimated power quantity comprising the thermal noise floor. This minimum is typically calculated over a pre-determined interval in time. If no measurements of channel power and in-cell interference are available, the power in question is the total received power, in the subset of tones typically corresponding to one user in a time slot. Note that subsets of tones of a set of users can also be used.

As it is a well known fact that the thermal noise floor contribution always is present it can be concluded that, in case measurement uncertainties are neglected, the noise floor contribution has to be equal to or smaller than the minimum value of the total received power in a subset of tones received within a certain period of time. In essence, the minimum value of the total power within a certain time interval constitutes an upper limit of the unknown noise floor.

A possible solution according to the above discussion could be a hard algorithm for estimation of the thermal noise power floor in the sense that a hard minimum value is computed over a sliding window and used as an estimate of the thermal noise power floor. Consequently, the noise floor could be determined as the minimum value (over a selected interval of time) of either the sum of the power of the noise floor and the power of neighbour interference or the total received power.

The neighbour interference is then subsequently calculated from the above of the above two quantities. The lower of the two above quantities does not allow a calculation of the neighbour cell interference. In case the interference from other tones of the cell is not measured, then it may be lumped together with the neighbour cell interference, to a total interference measure.

Figure 3:
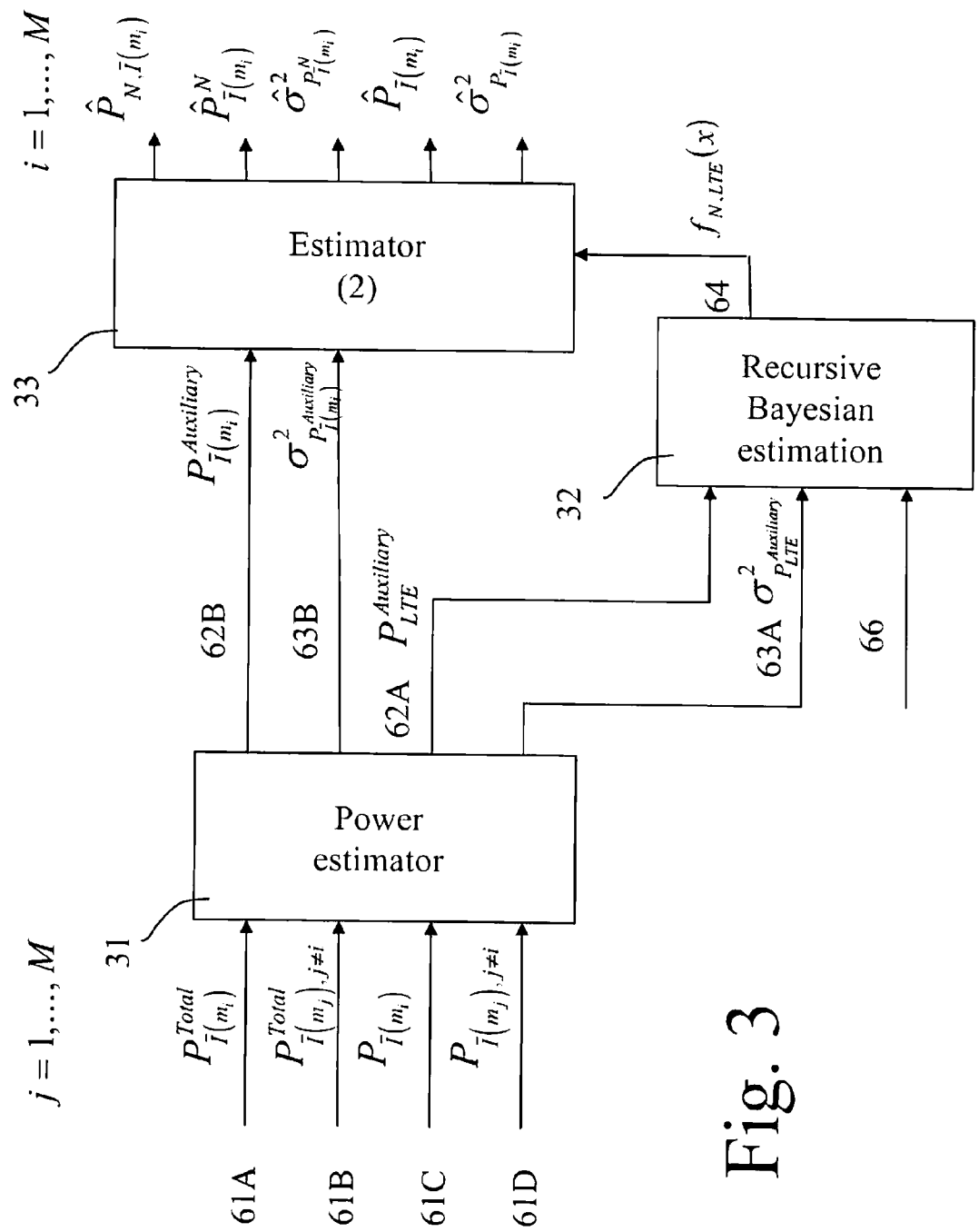
FIG. 3 is a schematic illustration of functionalities according to embodiments of the present invention.

With reference to FIG. 3, another possible solution provides a different principle, based on soft estimation of the thermal noise power floor and the neighbour cell interference. In the most advanced form, the neighbour cell interference estimation is performed in three main blocks.

The first block 31, i.e. power estimation block, applies a so called Kalman filter for estimation of certain power quantities that are needed by subsequent processing blocks. The invention relates to a Kalman filter, in particular the model and compensation for leakage power as will be discussed below. Specifically, the block 31 receives a number of inputs 61A-D comprising the measured received total power $P_{T(m_j)}^{Total}(t)$, 61A, in the subset of tones of terminal $m_i$, the measured total power of the subsets of tones of other terminals $m_j$, $P_{T(m_j)}^{Total}(t)$, 61B, the measured channel power $P_{T(m_i)}(t)$, 61C, in the subset of tones of terminal $m_i$, and the measured channel power $P_{T(m_j)}(t)$, 61D, of the subsets of tones of other terminals $m_j$. The block 31 provides outputs comprising power estimates 62A, 62B and corresponding standard deviations 63A, 63B. The output 62A is the estimate of a power quantity being the sum of neighbour cell interference power and thermal noise floor power for each sub-set of tones (i.e. multiple measurements) and the output 63A is the corresponding variance. The output 62B is also the estimate of a power quantity being the sum of neighbour cell interference power and thermal noise floor power for each sub-set of tones and the output 63B is the corresponding variance. Since the outputs are from the Kalman filter arrangement, these parameters are the only ones needed to define the estimated Gaussian distributions that are produced by the filter. Thus, enough information is given to define the entire probability distribution information of the power estimates.

The second block 32 applies recursive Bayesian estimation techniques in order to compute a conditional probability density function of the minimum of one of the above mentioned power quantities. Because of the recursive procedure appended below, said procedure modifies related techniques, based on sliding window estimates, thereby reducing the memory consumption to a negligible level.

The minimum also accounts (by Bayesian methods) for the prior distribution of the thermal noise power floor, thereby improving the average performance of the estimation when evaluated over an ensemble of radio base stations. The actual value of the noise floor can also be calculated by a calculation of the mean value of the estimated conditional probability distribution function.

The recursive algorithm can be applied either separately to each sub-set of tones or to the whole LTE uplink frequency band after summation of powers and variances.

Regarding the first alternative, individual estimation for each frequency is likely to be sensitive to random errors and several recursive thermal noise floor estimators need to be run. However, as compared to prior art, the memory consumption of the recursive algorithm is reduced by about a factor of 100, thereby enabling also application to individual subsets of tones.

Specifically regarding the second alternative, the block 32 receives the power estimates 62A and the corresponding standard deviations 63A as inputs, and provides an output 64 comprising the estimated probability distribution of an extreme value, typically the minimum computed recursively, intended to represent a good approximation of the conditional probability distribution of the thermal noise power floor. Parameters 66 giving information about a prior expected probability distribution of the noise floor power are provided to the conditional probability distribution estimation block 32 in order to achieve an optimal estimation.

The third block 33 performs the steps of
estimating of the conditional probability distribution of the thermal noise power floor of each subset of tones, for each time slot (typically representing a user terminal), from the conditional probability distribution of the uplink thermal noise power floor, obtained as the signal 64;

estimating of the neighbour cell interference power, for each time slot (typically representing a user terminal), from the conditional probability distribution of the thermal noise power floor of each subset of tones according to the above step, and from the signals 62B and 63B obtained from the block 51;

estimation of optimal estimates of the thermal noise floor and the corresponding variance, as well as the neighbour cell interference and the corresponding variance, said optimal estimates being obtained as conditional means of the conditional probability distributions of the first 2 bullets.

A modified version of the previously described method discloses a simplified soft solution. Only the total uplink LTE power is measured and a simplified algorithm for only thermal noise power floor estimation is applied. The simplified algorithm accordingly applies a simplified, one-dimensional Kalman filter for estimation as outlined in Appendix A. The reason why this filtering step is used is that the subsequent (still soft) processing blocks require probability distributions as input. These are best generated by a Kalman filter in the first processing block, corresponding to block 31 of the previously described method. Using this method alone, the corresponding thermal noise power floor values for the subsets of tones can then be computed as described below. However, the calculation of estimates of neighbour cell interference requires further processing. The estimation of neighbour cell interference is thus a critical component in that it provides an input to an LTE scheduler function of the eNodeB. There is a definite need for soft estimation of the thermal noise floors and neighbour cell interference levels for selected subsets of tones. Noise floor estimation is performed by the same algorithm for these two cases. Appendix B describes a soft noise floor estimation algorithm, which is the basis for the present recursive soft noise floor estimation algorithm.

Further definition of the present invention needs a description of the LTE air-interface, LTE scheduling mechanism, and LTE admission control algorithm.

1. The leakage of power from adjacent tones to any tone of the LTE uplink causes an additional source of interference. The disclosed techniques for estimation of the thermal noise power floor of subsets of tones and for subsequent estimation of neighbour cell interference power to the same subsets of tones benefit from a removal of said leakage power.

2. The prior art algorithms based on soft sliding window for estimation of the thermal noise power floor consumes too much memory for efficient eNodeB implementation. Hence, there is a need for more memory efficient soft noise floor estimate algorithms. There is also an additional need to provide soft noise floor estimate algorithms with enhanced tracking abilities.

3. It is beneficial for the LTE scheduler to know the level of neighbour cell interference in a subset of tones of the LTE uplink for a specific time slot. For this reason it is essential to provide means for estimation of the neighbour cell interference power and the thermal noise power floor, for each of said subset of tones of the LTE uplink. Given this information, the scheduler can assess the fraction of neighbour cell interference, as compared to the noise floor, for each subset of tones (a subset may also contain only one single tone). Note that no user may be allocated to some of said subsets of tones. Using the information on the fraction of neighbour cell interference, the scheduler can avoid scheduling of new users to subsets of tones with high values of said fraction of neighbour cell interference. This improves the transmission of information from the new users, so allocated. In addition, the new users avoid creating interference that would have corrupted users in neighbour cells that are the likely reason for any high level of said fraction of neighbour cell interference.

4. The admission control function of the LTE system also needs to know the levels of neighbour cell interference, in order to be able to avoid admission of users in case said fraction(s) of neighbour cell interference would be too high, overall or in selected subsets of tones.

5. There is a need for signaling the subset of said total cell power, total own cell channel power, total neighbour cell interference power, and thermal noise power floor for said subsets of sub-bands, to another function of the eNodeB, another eNodeB, or another node for use in admission control algorithms.

In order to meet the above mentioned needs, multiple measures have been identified:

Regarding the removal of the leakage power in processing mean of the block 31 it is first noted that all powers and measurements are assumed to model the sum of powers from all tones of the subset $m_i$. The following models are then introduced for the subset $m_i$:

$$P_{I(m_i)}(t+1) = P_{I(m_i)}(t) + w_{I(m_i)}(t) \quad (3)$$

$$P_{I(m_i)}^{Auxiliary}(t+1) = P_{I(m_i)}^{Auxiliary}(t) + w_{I(m_i)}^{Auxiliary}(t), i = 1, \ldots, M$$

$$P_{I(m_i),measurement}(t) = P_{I(m_i)}(t) + e_{I(m_i)}(t) \quad (4)$$

$$P_{I(m_i),measurement}^{Total}(t) = P_{I(m_i)}(t) + P_{I(m_i)}^{Auxiliary}(t) + P_{I(m_i),measurement}^{L}(t) + e_{I(m_i)}^{Total}(t).$$

Above, (3) is the state model and (4) is the measurement model. The states are selected as the own channel power of the subset of tones and the auxiliary power, which is intended to model the thermal noise power floor plus the neighbour cell interference power. $w_{I(m_i)}(t)$ and $w_{I(m_i)}^{Auxiliary}(t)$ denote the system noises associated with the selected states. These quantities are assumed to be Gaussian distributed.

The measurement equations (4) model the measurement of the own power of the subset of tones $m_i$, as well as the total measured power of the subset of tones $m_i$. The quantities $e_{I(m_i)}(t)$ and $e_{I(m_i)}^{Total}(t)$ denote the measurement noises of the selected measurements. These noises are assumed to be Gaussian distributed.

The quantity $P_{I(m_i),measurement}^{L}(t)$ has not been disclosed before. It is a pseudo-measurement that models the leakage of power from adjacent tones into the tones of the subset $m_i$. As can be seen, it can be moved over to the left side of the last equation of (4), thereby correcting the total power measurement. A suitable model for the leakage power is assumed to be $$P_{I(m_i),measurement}^{L}(t) = K \sum_{f_l \in I(m_i)} \sum_{f_k \neq f_j} P_{f_k,measurement}(t) \left( \frac{\sin\left(\frac{2\pi(f_k - f_j)}{\Delta f_{Tone}}\right)}{\left(\frac{2\pi(f_k - f_j)}{\Delta f_{Tone}}\right)} \right)^2 \quad (5)$$

where K is a constant and $P_{f,measurement}(t)$ denotes the channel power measurement on the single tone with frequency f.

Given the equations (3)-(5) a Kalman filter can be defined and executed. Regarding a memory efficient soft noise floor estimation, multiple processing means for the block 32 are identified.

To recapitulate, a possible straight-forward approach for estimating the minimum is to compute the estimate over a pre-determined interval of time, a so-called sliding window. The detailed mathematical description of the estimation of the conditional probability distribution based on such a sliding window is known in prior art and given in Appendix B. The algorithm of Appendix B requires parameters for management of the sliding window size, since the window size affects the computational complexity. More importantly, the algorithms require storage of two matrix variables, together occupying as much as 0.4-0.8 Mbyte of memory. In particular, one probability distribution function and one cumulative distribution function needs to be computed on a grid, for each power sample that is stored in the sliding window. Typically the grid is discretized in steps of 0.1 dB over the range −120 dBm to −70 dBm, resulting in 1000 variables, for each power sample in the sliding window. With 100 samples power samples in the sliding window, the result is a need to store 400000-800000 bytes depending on if 4 byte or 8 byte variables are used. This may be a too high memory consumption for typical DSP implementations in eNodeBs, in particular regarding the fact that each eNodeB may serve several cells and noise floor estimation is needed for each antenna branch of said cells. In addition one algorithm may be needed for each subset of tones for each antenna branch. The computational complexity is not a problem since the updates of the noise floor only need to take place a few times per minute, meaning that the noise floor updates for different cells can be scheduled to different intervals of time. A further problem indirectly relates to the use of a sliding window for estimation of a minimum, more particularly due to the fact that a power sample with a small value that enters the sliding window remains there during the whole duration of the window. During this period, the small value naturally dominates the minimum estimate. Hence, in case the noise floor starts to increase, this is not properly reflected until the power sample with a small value is finally is shifted out of the sliding window.

Thus, in view of disadvantages related to the use of a sliding window, in particular regarding the memory problems, the present invention instead uses a recursive algorithm for soft noise floor estimation.

In order to find a suitable recursive algorithm, approximations in the computation of the probability distribution of the minimum power, i.e. the noise floor estimate, are introduced.

All notation used in the following part of the description is explained in detail in the Appendix B. Briefly, t denotes time, x denotes (discretized) power, f denotes probability density functions and F denotes cumulative distribution functions.

The first step towards a recursive formulation is to remove the transient effect of the sliding window by consideration of the case where $$T_{Lag} \to \infty, \tag{6}$$

i.e. where the width of the sliding window becomes infinite.

Then, the key formula (B12) of Appendix B is transformed into:

$$f_{min\{x_{pTotal}^0(t')\}_{t' \leq t}: Y^t}(x) = \tag{7}$$

$$\sum_{t' \leq t} f_{\Delta x(t'|t)}\left(x - \hat{x}_{pTotal}^{Kalman}(t'|t)\right) \prod_{\substack{q \leq t \\ q \neq t'}} \left(1 - F_{\Delta x(q|t)}\left(x - \hat{x}_{pTotal}^{Kalman}(q|t)\right)\right).$$

For the discussion that follows, the update time t is discretized, i.e. a subscript $_N$ is introduced to give:

$$f_{min}(t_N \cdot x) \equiv f_{min\{x_{pTotal}^0(t')\}_{t' \leq t_N}: Y^{t_N}}(x) \tag{8}$$

$$= \sum_{t' \leq t_N} f_{\Delta x(t'|t_N)}\left(x - \hat{x}_{pTotal}^{Kalman}(t'|t_N)\right)$$

$$\prod_{\substack{q \leq t_N \\ q \neq t'}} \left(1 - F_{\Delta x(q|t_N)}\left(x - \hat{x}_{pTotal}^{Kalman}(q|t_N)\right)\right),$$

where $t_N$ is the discretized time of update.

The first approximation to be introduced is obtained by replacement of the smoothing estimate $\hat{x}_{pTotal}^{Kalman}(t'|t_N)$ by the filter estimate $\hat{x}_{pTotal}^{Kalman}(t'|t')$, according to:

$$\hat{x}_{pTotal}^{Kalman}(t'|t_N) \approx \hat{x}_{pTotal}^{Kalman}(t'|t'). \qquad \text{Assumption 1}$$

This assumption means that the smoothing gain is assumed to be small. In practice the approximation means that a slightly worse performance is accepted, to gain computational simplifications. Approximation 1 simplifies equation (8) to $$f_{min}(t_N \cdot x) \approx \tag{9}$$

$$\sum_{t' \leq t_N} f_{\Delta x(t'|t')}\left(x - \hat{x}_{pTotal}^{Kalman}(t'|t')\right) \prod_{\substack{q \leq t_N \\ q \neq t'}} \left(1 - F_{\Delta x(q|q)}\left(x - \hat{x}_{pTotal}^{Kalman}(q|q)\right)\right).$$

The next step comprises a formulation of a recursive update of a completed product. The completed product, $\Gamma(t_N, x)$ is defined as $$\Gamma(t_N, x) = \prod_{q \leq t_N} \left(1 - F_{\Delta x(q|q)}\left(x - \hat{x}_{pTotal}^{Kalman}(q|q)\right)\right). \tag{10}$$

It then follows that the completed product can be formulated recursively by:

$$\Gamma(t_{N+1}, x) = \prod_{q \leq t_{N+1}} \left(1 - F_{\Delta x(q|q)}\left(x - \hat{x}_{pTotal}^{Kalman}(q|q)\right)\right) \tag{11}$$

$$= \left(1 - F_{\Delta x(t_{N+1}|t_{N+1})}\left(x - \hat{x}_{pTotal}^{Kalman}(t_{N+1}|t_{N+1})\right)\right)$$

$$\prod_{q \leq t_N} \left(1 - F_{\Delta x(q|q)}\left(x - \hat{x}_{pTotal}^{Kalman}(q|q)\right)\right)$$

$$= \left(1 - F_{\Delta x(t_{N+1}|t_{N+1})}\left(x - \hat{x}_{pTotal}^{Kalman}(t_{N+1}|t_{N+1})\right)\right)$$

$$\Gamma(t_N, x).$$

This is the first result, where it is noticed that calculating a present completed product $\Gamma(t_{N+1},x)$ i.e. a product of complements of a cumulative error distribution of a first power quantity, can be computed as a product of a previously computed completed product $\Gamma(t_N,x)$, i.e. a previously computed product of complements of the cumulative error distribution of the first power quantity and a first factor $1-F_{\Delta x(t_{N+1}|t_{N+1})}(x-\hat{x}_{pTotal}^{Kalman}(t_{N+1}|t_{N+1}))$ based on a new complement, of the cumulative probability distribution for the first power quantity.

The next step is to obtain a recursive update of the probability density function of the minimum power itself, i.e. to write $f_{min}(t_N,x)$ recursively. This is obtained as follows, starting with (9).

$$f_{min}(t_{N+1}, x) \approx \sum_{t' \leq t_{N+1}} f_{\Delta x(t'|t')}\left(x - \hat{x}_{pTotal}^{Kalman}(t'|t')\right) \tag{12}$$

$$\prod_{\substack{q \leq t_{N+1} \\ q \neq t'}} \left(1 - F_{\Delta x(q|q)}\left(x - \hat{x}_{pTotal}^{Kalman}(q|q)\right)\right) =$$

$$f_{\Delta x(t_{N+1}|t_{N+1})}\left(x - \hat{x}_{pTotal}^{Kalman}(t_{N+1}|t_{N+1})\right)$$

$$\prod_{\substack{q \leq t_{N+1} \\ q \neq t_{N+1}}} \left(1 - F_{\Delta x(q|q)}\left(x - \hat{x}_{pTotal}^{Kalman}(q|q)\right)\right) +$$

$$\sum_{t' \leq t_N} f_{\Delta x(t'|t')}\left(x - \hat{x}_{pTotal}^{Kalman}(t'|t')\right)$$

$$\prod_{\substack{q \leq t_{N+1} \\ q \neq t'}} \left(1 - F_{\Delta x(q|q)}\left(x - \hat{x}_{pTotal}^{Kalman}(q|q)\right)\right) =$$

$$f_{\Delta x(t_{N+1}|t_{N+1})}\left(x - \hat{x}_{pTotal}^{Kalman}(t_{N+1}|t_{N+1})\right)$$

$$\prod_{q \leq t_N} \left(1 - F_{\Delta x(q|q)}\left(x - \hat{x}_{pTotal}^{Kalman}(q|q)\right)\right) +$$

$$\sum_{t' \leq t_N} f_{\Delta x(t'|t')}\left(x - \hat{x}_{pTotal}^{Kalman}(t'|t')\right)$$

$$\left(1 - F_{\Delta x(t_{N+1}|t_{N+1})}\left(x - \hat{x}_{pTotal}^{Kalman}(t_{N+1}|t_{N+1})\right)\right) \times$$

$$\prod_{\substack{q \leq t_N \\ q \neq t'}} \left(1 - F_{\Delta x(q|q)}\left(x - \hat{x}_{pTotal}^{Kalman}(q|q)\right)\right) =$$

$$f_{\Delta x(t_{N+1}|t_{N+1})}\left(x - \hat{x}_{pTotal}^{Kalman}(t_{N+1}|t_{N+1})\right)\Gamma(t_N, x) +$$

-continued $$\left(1-F_{\Delta x(t_{N+1}|t_{N+1})}(x-\hat{x}_{pTotal}^{Kalman}(t_{N+1}|t_{N+1}))\right)f_{min}(t_N,x).$$

Here it is seen that the computation of an updated conditional probability distribution of the noise floor measure $f_{min}(t_{N+1},x)$ can be performed as a summation of two terms. A first term $f_{\Delta x(t_{N+1}|t_{N+1})}(x-\hat{x}_{pTotal}^{Kalman}(t_{N+1}|t_{N+1}))\Gamma(t_N,x)$ is a product of the previously computed product $\Gamma(t_N,x)$ of complements of the cumulative error distribution of the first power quantity and a second factor $f_{\Delta x(t_{N+1}|t_{N+1})}(x-\hat{x}_{pTotal}^{Kalman}(t_{N+1}|t_{N+1}))$. This second factor is as seen based on a new probability distribution for the first power quantity. The second term $(1-F_{\Delta x(t_{N+1}|t_{N+1})}(x-\hat{x}_{pTotal}^{Kalman}(t_{N+1}|t_{N+1})))f_{min}(t_N,x)$ is a product of a previously computed conditional probability distribution $f_{min}(t_N,x)$ of the noise floor measure and the first factor $1-F_{\Delta x(t_{N+1}|t_{N-1})}(x-\hat{x}_{pTotal}^{Kalman}(t_{N+1}|t_{N+1}))$ already used in the recursive calculation of the completed product.

As a conclusion, it is seen that a recursive calculating of the conditional probability distribution of the noise floor measure is based on a previously computed conditional probability distribution of the noise floor measure, a previously computed product of complements of a previously computed cumulative error distribution of the first power quantity, and a new probability distribution for the first power quantity. The product of complements of the cumulative error distribution of the first power quantity is also recursively computable based on a previously computed product of complements of the cumulative error distribution of the first power quantity and a factor being the complement of a new cumulative probability distribution for the first power quantity. The recursive computation is in other words a coupled recursive computation of two quantities, namely the conditional probability distribution of the noise floor measure itself and the product of complements of the cumulative error distribution of the first power quantity. These are the main entities which have to be stored from one update to the next. Said main entities are discretized over the same power grid as used by the sliding window algorithm (see Appendix B), however, the time dimension of the sliding window is removed. A reduction of the memory requirements by a factor of 100 as compared to soft noise floor algorithm based on sliding window techniques can be achieved.

Figure 4:
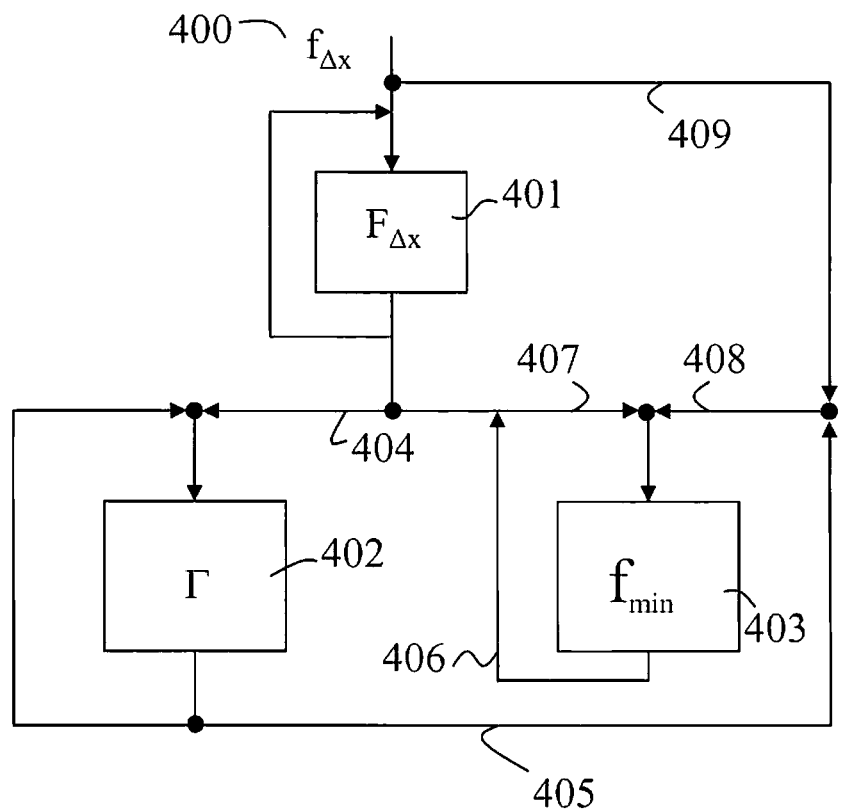
FIG. 4 is an illustration of interdependent recursive algorithms according to the present invention.

The recursive computation can be illustrated graphically as in FIG. 4: 400 denotes a currently computed error distribution for the first power quantity. A cumulative error distribution of the first power quantity is calculated in 401. The first factor 404, based on the cumulative error distribution, is entered into the recursive calculation 402 of a product of complements together with the previously computed product of complements 405. The previously computed product of complements 405 is also combined with a second factor 409 into a first term 408 for the recursive calculation 403 of the conditional probability distribution of the noise floor measure. The second term 407 into this calculation 403 comprises the first factor 404 and a previously calculated conditional probability distribution 406 of the noise floor measure.

The presently proposed recursive approach involves an approximation. However, the influence of this approximation is almost negligible. The variation between a sliding window implementation and the recursive algorithm disclosed in the present document is only about 0.05 dB mean square. The varying behavior of the disclosed algorithm is due to a tuning for best tracking performance.

In its basic form, the recursive approach implies the property of never forgetting any previous information completely. The algorithm will therefore converge to a steady state and any drifts or changed conditions will have problems to influence the noise floor estimation after a while. It is therefore a further embodiment to include some sort of data forgetting mechanism.

A first alternative of data forgetting is simply to interrupt the algorithm and let the algorithm start up again from initial values. This will allow for changes in conditions but will decrease the performance during the first period after start-up. Thus, a further alternative is to let a new recursion start up some time before the old one is stopped. In such a case, the new one may have approached the true noise floor value better before it is actually used. This, however, implies two parallel recursions that are active for some time. According to yet another alternative data forgetting can be introduced by recursive discrete time filtering techniques, e.g. by means of a standard recursive first order discrete time filter. The bandwidth of the resulting algorithm is directly controlled by the filter constants of the recursive filter. For each fixed power grid point, the recursion (12) is in a form that immediately lends itself to introduction of data forgetting, considering $f_{min}(t_N,x)$ as the state and $\Gamma(t_N,x)$ as the input. Using $0<\beta<1$ as filter constant, results in the recursion:

$$f_{min}(t_{N+1},x) = \beta(1-F_{\Delta x(t_{N+1}|t_{N+1})}(x-\hat{x}_{pTotal}^{Kalman}(t_{N+1}|t_{N+1})))f_{min}(t_N,x)+(1-\beta)f_{\Delta x(t_{N-1}|t_{N+1})}(x-\hat{x}_{pTotal}^{Kalman}(t_{N+1}|t_{N+1}))\Gamma(t_N,x). \quad (13)$$

The recursion (11) cannot be cast into linear recursive filtering form as it stands. However, by taking logarithms, the following recursion is obtained $$\ln(\Gamma(t_{N+1},x)) = \ln(1-F_{\Delta x(t_{N+1}|t_{N+1})}(x-\hat{x}_{pTotal}^{Kalman}(t_{N+1}|t_{N+1})))+\ln(\Gamma(t_N,x)). \quad (14)$$

Data forgetting can then be introduced into (14) using the filter constant $\alpha$. The result is:

$$\ln(\Gamma(t_{N+1},x)) = (1-\alpha)\ln(1-F_{\Delta x(t_{N+1}|t_{N+1})}(x-\hat{x}_{pTotal}^{Kalman}(t_{N+1}|t_{N+1})))+\alpha\ln(\Gamma(t_N,x)). \quad (15)$$

After exponentiation, the following geometric filtering recursion is obtained:

$$\Gamma(t_{N+1},x) = (1-F_{\Delta x(t_{N+1}|t_{N+1})}(x-\hat{x}_{pTotal}^{Kalman}(t_{N+1}|t_{N+1})))^{1-\alpha}\Gamma(t_N,x)^{\alpha}. \quad (16)$$

The recursions (13) and (16) constitute the end result. The output from these coupled recursions is combined with the prior information as in (B13) of Appendix B, and the calculations proceed from there.

Initiation of (13) and (16) is obtained by putting:

$$\Gamma(t_0,x)=1 (\Rightarrow \Gamma(t_1,x)=1-F_{\Delta x(t_1|t_1)}(x-\hat{x}_{pTotal}^{Kalman}(t_1|t_1))) \quad (17)$$

$$f_{min}(t_0,x)=0 (\Rightarrow f_{min}(t_1,x)=f_{\Delta x(t_1|t_1)}(x-\hat{x}_{pTotal}^{Kalman}(t_1|t_1))), \quad (18)$$

which is the correct initial behavior.

Still other alternatives to introduce data forgetting relate to the use of stochastic propagation of the probability density function of (12). This requires a dynamic model assumption for the diffusion of the probability density function. The approach is fairly complicated and is not treated in detail here.

The introduction of recursive algorithms for soft noise floor estimation require only approximately 0.005 Mbyte of memory per cell, i.e. about 1% compared to sliding window approaches. The recursive algorithms reduce the computational complexity further, also as compared to the sliding window algorithms. They avoid the need for control of the computational complexity with parameter constraints, thereby also reducing the number of parameters for management significantly. They also allow tuning by consideration of standard engineering bandwidth considerations, using alpha and beta tuning parameters.

The tracking properties of the recursive algorithms can be further improved, e.g. by introducing a specific handling of certain threshold parameters to obtain good tracking properties over very wide dynamic ranges. During iterations the values of the probability density function of the minimum power can become very small in grid points well above the wideband power measured in a cell. It can even be 0 to within the resolution of the computer arithmetic. This is acceptable as long as the thermal noise floor does not change. However, in case the thermal noise power floor suddenly increases, very small values of the probability density function that fall below the measured wideband power after the noise floor change, will require a very long time to grow until they become close to 1. As a consequence, the tracking ability will be poor in case the noise floor would increase. Actual changes can thereby take very long times before being noticed at all. In order to counteract this unwanted behavior, a minimum permitted value of the probability density function of the minimum power is introduced. Any calculation of a smaller value will be exchanged to the minimum value. Typically, a value around 0.000001 has been found to be suitable.

However, a consequence of the above change is an unwanted bias when the estimate of the thermal noise power floor is estimated. The origin of said bias is the artificially high values of the probability density function of the minimum power that is normally introduced in the majority of the grid points. These high values result in domination by high power grid points in the conditional mean, a fact that manifests itself in a too high estimated noise power floor. Fortunately this latter problem can be taken care of by simply removing power grid points that are at the minimum level from all calculations of the conditional mean. In other words, for the purpose of estimating the thermal noise power floor, the grid points falling below the minimum value are instead set to identically zero. Note that this should also be applied when a soft noise rise estimate is computed using a quotient distribution. The algorithmic additions enable tracking over more than 50 dB of input power. This in turn makes it possible to efficiently handle erroneously configured eNBs that can occur in LTE networks. Such erroneously configured RBSs may see artificial noise floors between −120 dBm and −70 dBm. Furthermore, one can avoid the need for the safety nets that are required for various sliding window algorithms. These safety nets introduce logic for further control of the estimated thermal noise floor.

Regarding obtaining an estimate of the thermal noise power floor for each subset of tones the approach described herein is to apply one instance of the recursive soft noise floor estimator defined above to the sum of the estimated auxiliary powers of the respective subsets of tones estimated with a Kalman filter based on the model defined in equations (3)-(5). These are obtained as the signals 62B and 63B. The input to the noise power floor estimator then consists of auxiliary power of the complete LTE uplink frequency band as illustrated in FIG. 2. In principle, the estimation of the thermal noise power floor can also be performed according to FIG. 3 using the total wideband power of the LTE uplink frequency band. This can sometimes be performed directly at the radio unit of the eNodeB.

For a "soft scaling" algorithm, the output is the conditional probability distribution of the thermal noise power floor of the LTE uplink band discretized on a user chosen power grid (see appendix B for details). This signal is provided as the entity 64. This conditional probability distribution is denoted $f_{P_{N,LTE}}(x)$, where x denotes a power (discretization is omitted here for notational convenience).

The problem is now that the noise power floor of the subsets of tones differs from the noise power floor of the complete uplink LTE band. However, by performing a change of power variables a transformation that yields the desired conditional probability distributions results. From the definition of a probability distribution function it follows that $$f_{P_{N,I(m_i)}}(x) = \frac{d}{dx} F_{P_{N,I(m_i)}}(x), \quad i=1,\ldots,M, \quad (19)$$

where $$F_{P_{N,I(m_i)}}(x), i=1,\ldots,M,$$

i=1, . . . , M, denotes the corresponding cumulative probability distribution functions. By definition and use of the properties of thermal noise $$F_{P_{N,I(m_i)}}(x) = Pr(P_{N,I(m_i)} \leq x) \quad (20)$$

$$= Pr\left(\left(\Delta f_i \Big/ \sum_{i=1}^{F} \Delta f_i\right) P_{N,LTE} \leq x\right)$$

$$= Pr\left(P_{N,LTE} \leq \left(\sum_{i=1}^{F} \Delta f_i / \Delta f_i\right) x\right)$$

$$= F_{P_{N,LTE}}\left(\left(\sum_{i=1}^{F} \Delta f_i / \Delta f_i\right) x\right), \quad i=1,\ldots,M,$$

from which it follows from (19) that $$f_{P_{N,I(m_i)}}(x) = \left(\frac{\sum_{i=1}^{F} \Delta f_i}{\Delta f_i}\right) f_{P_{N,LTE}}\left(\left(\sum_{i=1}^{F} \Delta f_i / \Delta f_i\right) x\right), \quad (21)$$

$$i=1,\ldots,M.$$

Following a discretization of equation (21) together with an estimation of the noise power floor of the complete LTE uplink band represents a good strategy since all available signal energy is used and since only one instance of the thermal noise power floor algorithm is used.

A "hard scaling" algorithm provides a quantity $P_{N,LTE}^{Hard}$ which is the minimum estimated by a recursive soft noise floor algorithm. From this it can be calculated $$P_{N,I(mi)}^{Hard} = \frac{\Delta f_i}{\sum \Delta f_i} P_{N,LTE}^{Hard}.$$

There are thus two main alternatives for obtaining estimates of the neighbour cell interference power, more particularly a hard neighbour cell interference estimation or a soft neighbour cell interference estimation.

To describe the first alternative regarding hard estimation, the input to this computation consists of The measured own channel power of the subset $m_i$ of tones, $P_{I(m_i)}(t)$, i=1 . . . M.

The measured total power of the subset $m_i$ of tones, $P_{I(m_i)}^{Total}(t)$, i=1, . . . , M.

The optimal estimate of the thermal noise power floor of the subset $m_i$ of tones, $\hat{P}_{N,\bar{I}(m_i)}(t)$, i=1, . . . , M, here obtained by the recursive algorithm above.

The (pseudo-) measured own cell uplink leakage power, $P_{\bar{I}(m_j)}^L(t)$, i=1, . . . , M, cf. (5).

The estimate of the neighbour cell interference is then computed as $$\hat{P}_{\bar{I}(m_i)}^N(t) = P_{\bar{I}(m_i)}^{Total}(t) - P_{\bar{I}(m_i)}(t) - P_{\bar{I}(m_i)}^L - \hat{P}_{N,\bar{I}(m_i)}(t), i=1,\ldots,M. \quad (22)$$

The optimal estimate of the thermal noise power floor may be computed softly or hardly (i.e. as a minimum value). If a recursive method is used for noise floor estimation then the thermal noise power floor is given by the so called conditional mean, computed from the conditional probability density function $$f_{P_{N,\bar{I}(m_i)}}(x).$$

In the continuous domain, the formula for the computation is $$\hat{N}_{f_i}(t) = \int_{-\infty}^{+\infty} x f_{P_{N,\bar{I}(m_i)}}(x)dx, \quad i=1,\ldots,M. \quad (23)$$

In a practical implementation the integral is replaced by a sum over a discretization grid. The same one-dimensional grid that is used for estimation of $$f_{P_{N,\bar{I}(m_i)}}(x)$$

is preferably used.

To describe the second alternative regarding soft neighbour cell interference estimation it is noted that this approach differs from the hard alternative in that a probability distribution function for the neighbour cell interference is first computed. The optimal estimate of the neighbour cell interference then follows by a computation of the conditional mean of this probability distribution function. An advantage of this approach is that it is optimal. A further advantage is that it is possible to compute an uncertainty measure of the computed optimal estimate. This measure is the so called conditional variance. The uncertainty is highly valuable for LTE scheduling and admission control operation, when signaled to said scheduling and admission control functions/nodes.

Noting that after filtering in the block 31 and recursive estimation of the conditional probability distribution of the thermal noise power floor in the block 32, the following equation holds $$P_{\bar{I}(m_i)}^N(t) = P_{\bar{I}(m_i)}^{Auxiliary}(t) - P_{N,\bar{I}(m_i)}(t), i=1,\ldots,M, \quad (24)$$

Since the two stochastic variables on the right hand side of (24) have both been characterized in terms of their conditional probability distributions, it follows that the conditional probability distribution function of the neighbour cell interference power of each subset $m_i$ of tones can be computed by a computation of the distribution of the difference between two stochastic variables. The following (known) result can be used for this purpose:

When considering two stochastic variables X and with distributions $f_X(x)$ and $f_Y(y)$, the difference Z=X−Y has the distribution $$f_Z(z) = \int_{-\infty}^{+\infty} f_X(x) f_Y(z+x) dx.$$

In a practical implementation all continuous quantities are discretized on their own individual grid. The probability distribution of the auxiliary powers is provided by the signals 62B and 63B whereas the conditional probability distribution of the thermal noise power floor is provided by equation (8) exploiting the input 64 form block 52.

In order to describe the procedure for soft estimation of the thermal noise power floor, the following steps are used in a conceivable embodiment of the present invention:

Step 1:

Inputs: The following input signals are used $$f_{P_{\bar{I}(m_i)}}(t),$$

a Gaussian, distribution with mean obtained from 62B and a variance obtained from 63B, i=1, . . . , M.

$f_{N,\bar{I}(m_i)}(t)$, the conditional probability distribution of the thermal noise power floor estimator obtained from (21)

Both the above quantities are discretized.

Calculation: This is performed according to the Prior result, resulting in the distribution $$f_{P_{\bar{I}(m_i)}^N}(z), i=1,\ldots M.$$

Step 2:

The optimal estimate of the neighbour cell interference, and the corresponding optimal variance, are computed as conditional means $$\hat{P}_{\bar{I}(m_i)}^N(t) = \int_{-\infty}^{+\infty} x f_{P_{\bar{I}(m_i)}^N}(x)dx, \quad i=1,\ldots,M, \quad (25)$$

$$\hat{\sigma}_{P_{\bar{I}(m_i)}^N}^2(t) = \int_{-\infty}^{+\infty} \left(x - \hat{P}_{\bar{I}(m_i)}^N\right)^2 f_{P_{\bar{I}(m_i)}^N}(x)dx, \quad i=1,\ldots,M, \quad (26)$$

using a suitable discretization.

The scheduling and primarily the admission control algorithms of the LTE system, require signaling of the quantities estimated above, to the node(s) where the scheduling and admission control algorithms are located. The following alternative pieces of information are useful to transmit to the scheduling and admission control nodes of the LTE system:

$$\hat{P}_{N,\bar{I}(m_i)}, \hat{P}_{\bar{I}(m_i)}^N, \hat{\sigma}_{P_{\bar{I}(m_i)}^N}^2, \hat{P}_{\bar{I}(m_i)}(t), \hat{\sigma}_{P_{\bar{I}(m_i)}}^2 \quad i=1,\ldots M, . \quad 1$$

cellID (implicitly or explicitly).

2. $\hat{P}_{N,\bar{I}(m_i)}, \hat{P}_{\bar{I}(m_i)}^N, \hat{P}_{\bar{I}(m_i)}(t)$, i=1, . . . , M i=1, . . . , I, cellID (implicitly or explicitly).

$$\hat{P}_{N,\bar{I}(m_i)}, \hat{P}_{\bar{I}(m_i)}^N / \hat{P}_{N,\bar{I}(m_i)}, \hat{\sigma}_{P_{\bar{I}(m_i)}^N}^2 / \hat{P}_{N,\bar{I}(m_i)}^2, \quad 3$$

-continued $$\hat{P}_{I(m_i)} / \hat{P}_{N,I(m_i)}, \hat{\sigma}^2_{P_{I(m_i)}} / \hat{P}^2_{N,I(m_i)}$$

$$i = 1, \ldots M,.$$

cellID (implicitly or explicitly).

4. $\hat{P}_{N,I(m_i)}$, $\hat{P}_{I(m_i)}^N/\hat{P}_{N,I(m_i)}$, $\hat{P}_{I(m_i)}/\hat{P}_{N,I(m_i)}$, i=1, . . . , I, cellID (implicitly or explicitly).

In addition to the above-discussed algorithms, the interfacing of them into the existing eNodeB system needs some enhancements.

In the description above, it is assumed that the power estimations concern uplink LTE communication. The power measurements are in such cases performed by a node in the E-UTRAN, typically the eNodeB. However, at least parts of the procedure, e.g. the determining and/or estimating steps, may also be performed in other parts of the communication network.

Figure 6:
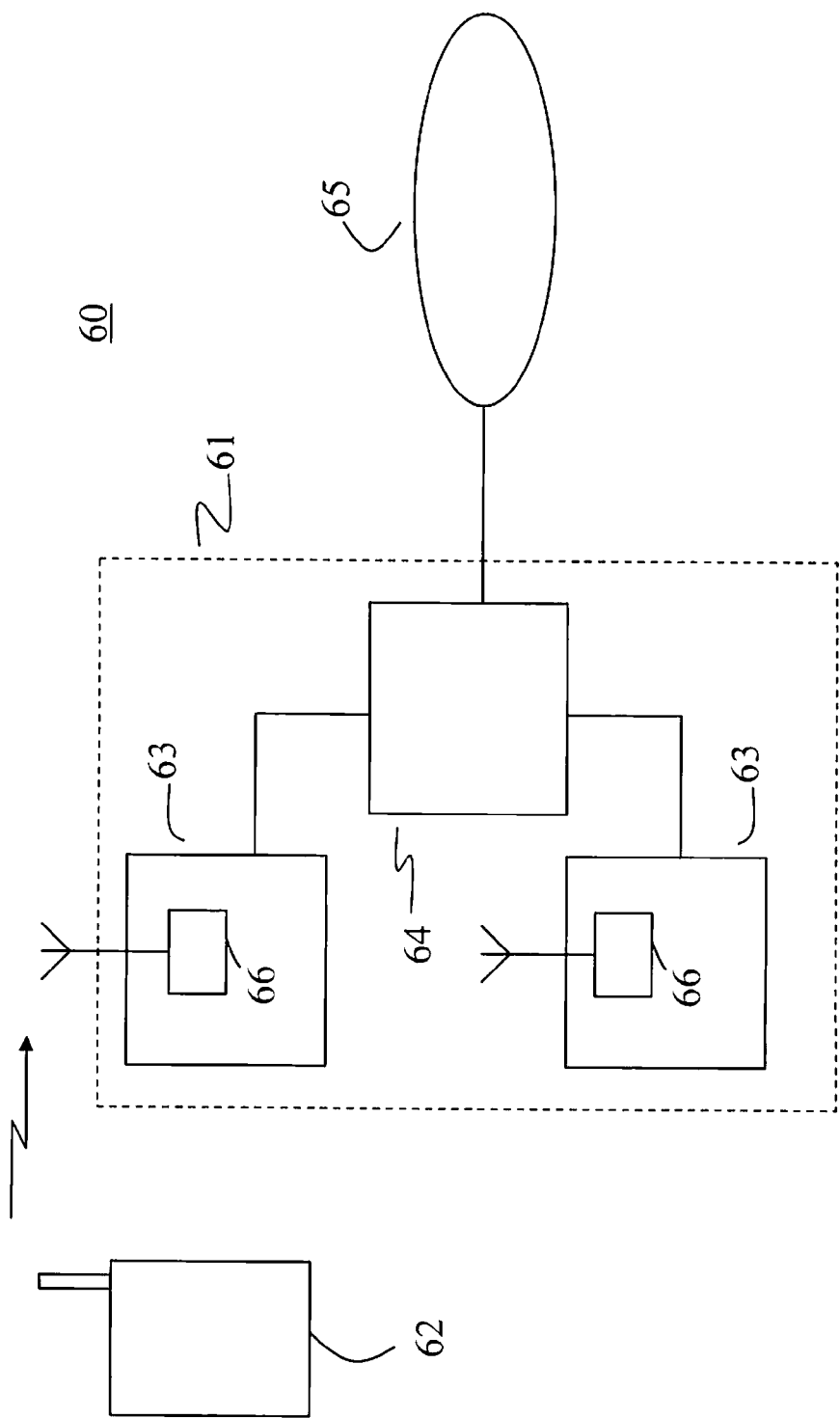
FIG. 6 illustrates main parts of an embodiment of a system according to the present invention.
Figure 7A:
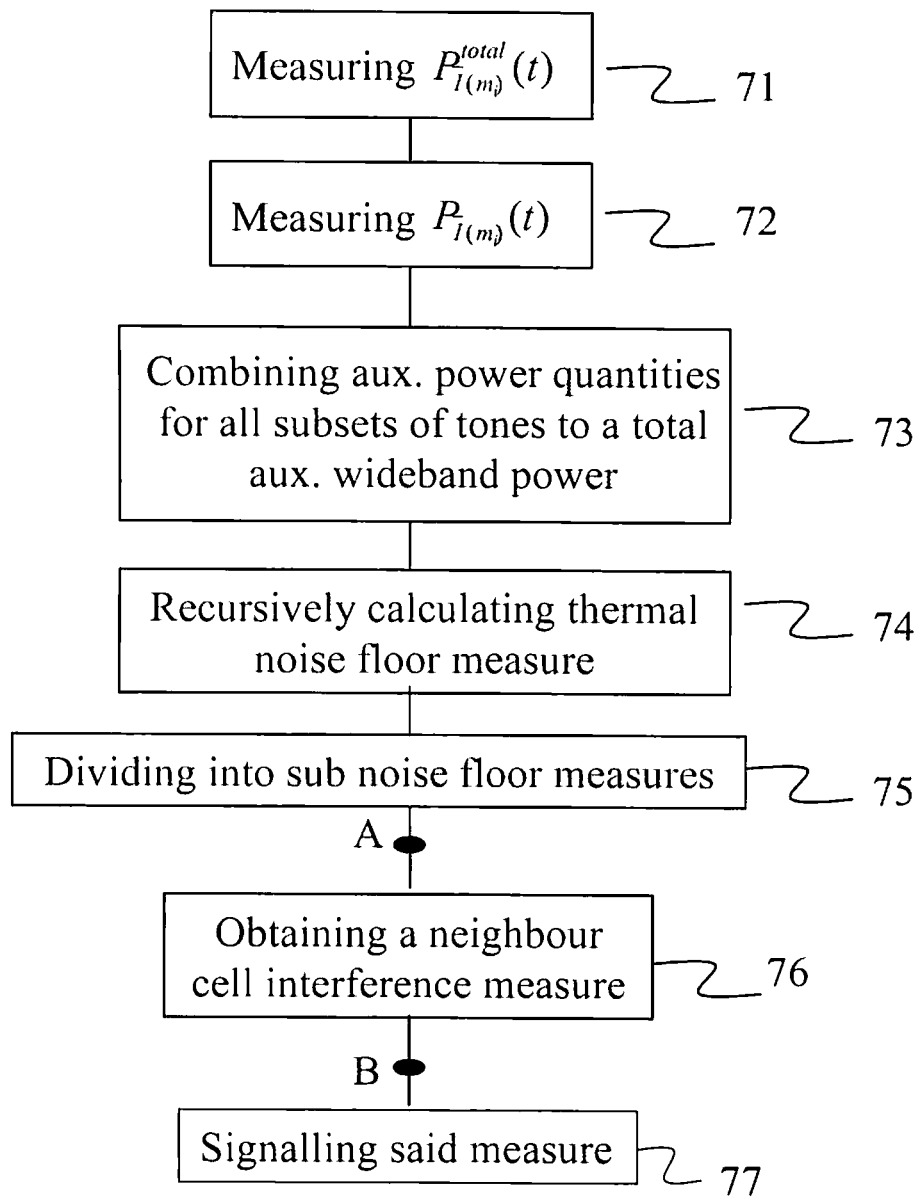
FIG. 7a-7c are flowcharts illustrating the method according to the present invention.
Figure 7B:
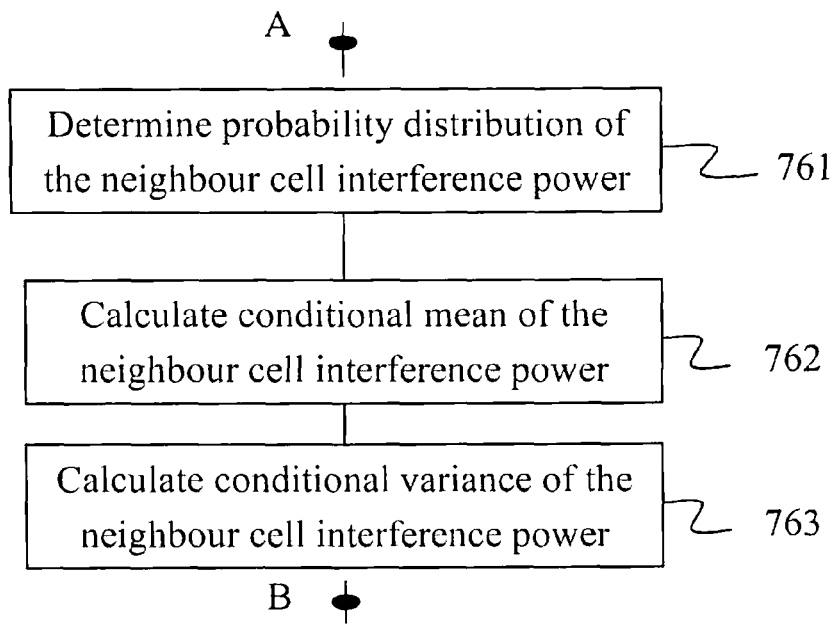
Figure 7C:
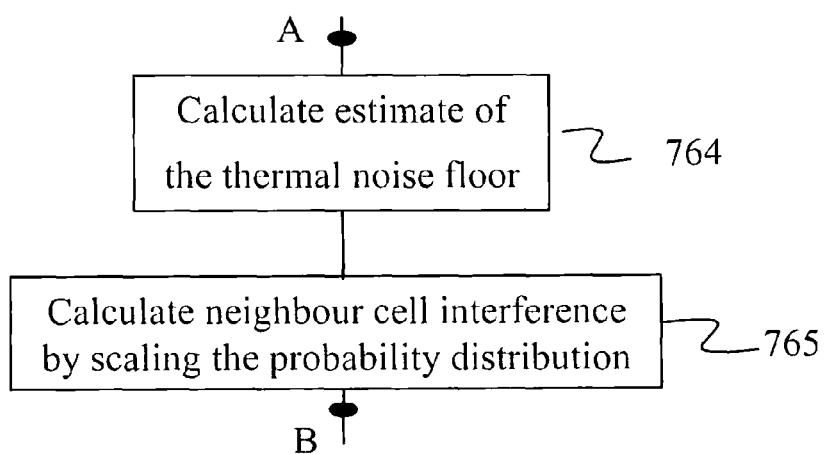

FIG. 6 illustrates main parts of an embodiment according to the present invention in a wireless communication system 60. Said communication system 60 comprises a radio access network 61, e.g. E-UTRAN. A mobile terminal 62 is in radio contact with an eNodeB 63 in the radio access network 61. The eNodeB 63 is connected to a gateway node 64 comprising, inter alia, mobility management entity and user plane entity and connected to the core network (CN) 65. In this embodiment, the eNodeB 63 further comprises means 66 for determining neighbour cell interference estimates and thermal noise floor estimates for subsets of tones for the uplink.

Advantages of the present invention comprise:
- Means for recursive estimation of the thermal noise power floor for subsets of tones in the uplink of an LTE system, said means being optimal, thereby providing a superior estimation performance
- Means for estimation of neighbour cell interference for subsets of tones in the uplink of an LTE system, said mean being optimal, thereby providing superior estimation performance.
- Signaling means for transmission of the optimal estimates to the LTE scheduling function, thereby providing the scheduler with superior information for cellular traffic scheduling decisions.
- Signaling means for transmission of the optimal estimates to the LTE admission control function, thereby providing the admission control function with superior information for cellular traffic scheduling decisions.

Figure 9:
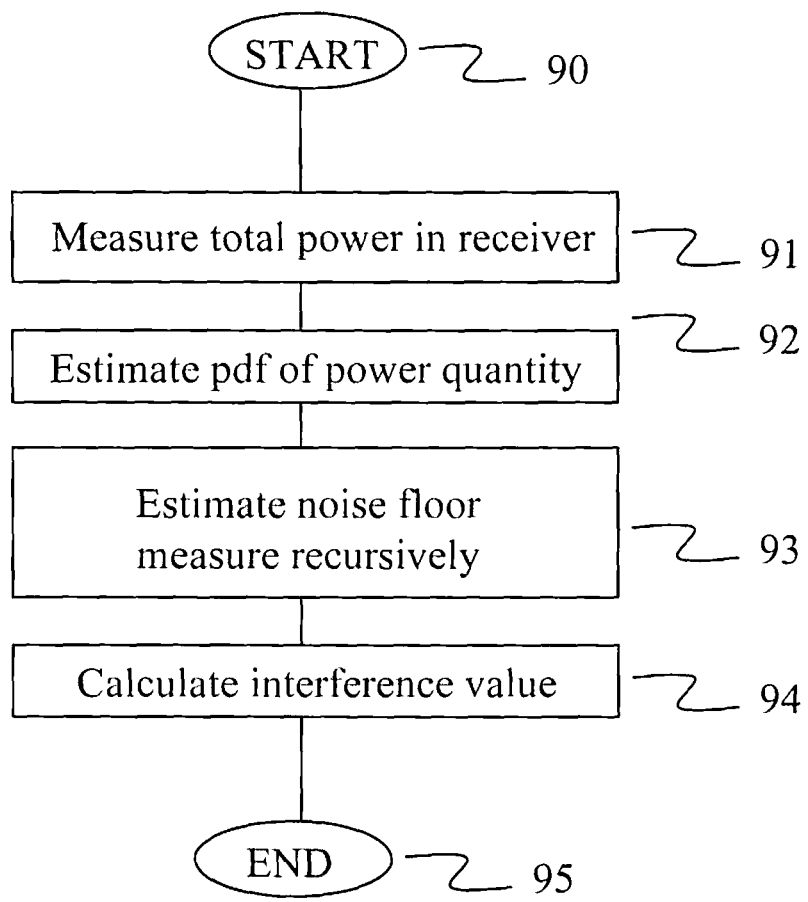
FIG. 9 illustrates a flow diagram of main steps of an embodiment of the method according to the present invention.

FIG. 9 illustrates a flow diagram of main steps of an embodiment of the method according to the present invention. The procedure starts in step 90. In step 91, a number of samples of at least the total uplink power are measured. In step 92, a probability distribution for a first power quantity is estimated from at least the measured samples of the total uplink power. The first power quantity can be the total uplink power. In step 93, a conditional probability distribution of a noise floor measure is computed based on at least the probability distribution for the first power quantity. This step is performed recursively. Finally, in step 94, a value of an interference measure is calculated based at least on the conditional probability distribution for the noise floor measure. The procedure ends in step 95.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

APPENDIX A

Kalman filter for RTWP measurements

A proposed algorithm for the case where the total RTWP is measured is a prediction-update filter, where the subscripts distinguish between the prediction and the update steps.

$$K_{Update}(t) = \frac{P_{Prediction}^{Cov}(t - T_{min})}{P_{Prediction}^{Cov}(t - T_{min}) + r_{Measurement}} \quad (A1)$$

$$P_{Update}^{Total}(t) = \quad (A2)$$
$$P_{Prediction}^{Total}(t - T_{min}) + K_{Update}(t) \times (P_{Measurement}^{Total}(t) - P_{Prediction}^{Total}(t))$$

$$P_{Update}^{Cov}(t) = P_{Prediction}^{Cov}(t - T_{min}) - \frac{P_{Prediction}^{Cov2}(t - T_{min})}{P_{Prediction}^{Cov}(t - T_{min}) + r_{Measurement}} \quad (A3)$$

$$P_{Prediction}^{Total}(t) = P_{Update}^{Total}(t) \quad (A4)$$

$$P_{Prediction}^{Cov}(t) = P_{Update}^{Cov}(t) + \frac{T_{min}}{T_{Correlation}} r \quad (A5)$$

(A1)-(A5) are repeated increasing t by steps of $T_{min}$. Initialization is made at t=0 by:

$$P_{prediction}^{Total}(0) = P_0^{Total} \quad (A6)$$

$$P_{Prediction}^{Cov}(0) = P_0. \quad (A7)$$

As seen above, the updating gain $K_{Update}(t)$ is computed from the model parameter $r_{Measurment}$ and from a predicted covariance $P_{Prediction}^{Cov}(t-T_{min})$ obtained at the previous sampling instance. The total wideband power updated with the latest measurement $P_{Update}^{Total}(t)$ is then computed, using the prediction $P_{Prediction}^{Total}(t)$ and the new measurement $P_{Measurement}^{Total}(t)$. The next step is to compute the updated covariance $P_{Update}^{Cov}(t)$ from the predicted covariance and from $r_{measurement}$. In the final steps of iteration new values of $P_{prediction}^{Total}(t)$ and $P_{Prediction}^{Cov}(t)$ are calculated and the time is stepped. $T_{min}$ denotes the sampling period.

APPENDIX B

Estimation of the conditional probability distribution of a minimum power $$\min_{t' \in [t-T_{Lag}, t]} P^{Total}(t').$$

Note: It is very natural to estimate minimum powers. However, the choice to use the minimum value is really ad-hoc. In a general case, an extreme value of a quanity in some way dependent on the estimated $P^{Total}$ quantity would be possible to use as a base for the further computations. However, as a simplest embodiment the quantity $$\min_{t' \in [t-T_{Lag}, t]} P^{Total}(t')$$

is considered here. Note that $P^{Total}$ in the coming disscussion refers to the total uplink power. In this appendix t is used to donate time.

Notation, conditional probability and Baye's rule

In the following Bayes rule and the definition of conitional mean, for probability distributions, are used extensively. The following definitions and results can be found e.g. in any text book estimation.

Probability distributions: Consider two events A and B, with probability distributions $f_A(x)$ and $f_B(y)$, respectively. Then the joint probability distribution of A and B is denoted $f_{A,B}(x,y)$.

Note that the events and the conditioning are expressed by subscripts, whereas the independent variables appear within the parentheses. This notation is used only when probability distributions and cumulative probability distributions are used. When state estimates and convariances, e.g. of the Kalman filter, are refered to, the conditioning may also appear within parenthess.

conditional probability distributions: The conditional probability distributions $f_{A\backslash B}(x)$ and $f_{B\backslash A}(y)$ are defined by:

$$f_{A,B}(x,y) = f_{A\backslash B}(x)f_B(y) = f_{B\backslash A}(y)f_A(x). \tag{B1}$$

Note that as a consequence of the notation for probability distributions, also the conditioning is expressed as subscripts.

A solution of the above equation now results in the famous Bayes rule:

$$f_{A|B}(x) = \frac{f_{B|A}(y)f_A(x)}{f_B(y)}. \tag{B2}$$

Note that the rules above are best understood by useing intersecting circle diagrams. The formal proofs to obtain the results for probability distributions can e.g. use infinitesimal limiting versions of motivations for the probability cases.

Conditional probability of the minimum—model and general expressions

In this section some general properties of a minimum estimator are derived. Towards that end, the following notation is introduced. The Kalman filter or Kalman smoother estimate of $P^{Total}(t')$ is denoted by:

$$\hat{x}_{pTotal}^{Kalman}(t' \mid Y^t) \equiv \hat{x}_{pTotal}^{Kalman}(t' \mid \{y(s)\}_{s \in [-\infty,t]}) \tag{B3}$$

$$= \hat{x}_{pTotal}^{Kalman}(t' \mid \{y(s)\}_{s \in [t-T_{Log},t]},$$

$$\hat{x}_{pTotal}^{Kalman}(t - T_{Log} \mid Y^{t-T_{Log}})).$$

Here t' denotes some time within $\lfloor t-T_{Lag}, t \rfloor$. The conditional distributions are, under mild conditions, all Gaussian sufficient statistics, i.e. onloy second order properties are needed in order to describe the conditional probability distributions. This is reflected in the conditioning in the last expression of (B3). The conditional distributions follow as:

$$f_{\hat{x}_{pTotal}^{Kalman}(t')|Y^t}(x) \in N(\hat{x}_{pTotal}^{Kalman}(t' \mid t), (\sigma_{pTotal}^{Kalman}(t' \mid t))^2), \tag{B4}$$

where $^{kalman}$ indicates that the estimate is computer with the kalman filter or, if t'<t, the Kalman smoother. The quantities $\hat{x}_{pTotal}^{Kalman}(t'|t)$ and $(\sigma_{pTotal}^{Kalman}(t'|t))^2$ denote the power estimate and the corresponding covariance, respectively, i.e. the inputs to the estimator. Note that (B4) assumes that the corresponding estimate at time $t-T_{Lag}$ is used as initial value for the Kalman filter.

Then the conditional distribution for the minimum value of the power estimate can be further developed. Towards that end the following model is assumed for the relation between $x_{pTotal}^0(t')=P^{0,Total}(t')$ that represents the true power and $\hat{x}_{pTotal}^{Kalman}(t'|t)=\hat{P}^{Total}(t'|t)$ that represents the estimate:

$$x_{pTotal}^0(t')=\hat{x}_{pTotal}^{Kalman}(t'|t)+\Delta x_{pTotal}(t'|t) \tag{B5}$$

$$x_{pTotal}^0(t') \in N(\hat{x}_{pTotal}^{Kalman}(t'|t), (\sigma_{pTotal}^{Kalman}(t'|t))^2). \tag{B6}$$

This is in line with the above discussion on sufficient statistics. The notation for the distribution of $\Delta x_{pTotal}(t'|t)$ is henceforward simplified to:

$$f_{\Delta x}(x). \tag{B7}$$

Note that this distribution does not have to be assumed to be Gaussian (although this is mostly the assumption made).

The conditional probability distribution of the minimum value of $x_{pTotal}^0(t')=P^{0,Total}(t')$, $t' \in \lfloor t-T_{Lag},t \rfloor$ is then to be estimated using data y (t), obtained from the time interval $[-\infty,t]$.

As will be seen below, smoother estimates are theoretically required as inputs to the conditional probability estimation algorithm for the minimum power that operates over the time interval $\lfloor t-T_{Lag},t \rfloor$. To formally retain optimality in the development, the smoother estimates should also be calculated using all data in $\lfloor t-T_{Lag},t \rfloor$. However, in a practical implementation, these smoother estimates are typically computed using only a short snapshot of data around the selected smoothing time instance. Several such smoothing estimates, from $\lfloor t-T_{Lag},t \rfloor$, are then combined to estimate the conditional probability distribution. In the coming discussion the interval $\lfloor t-T_{Lag},t \rfloor$ is retained in all quantities though, so as not to complicate the development too much. A further simplification can be obtained by replacement of the smoother estimate with a Kalman filter estimate. Simulations indicate that this can be done with very little loss of performance.

The conditional distribution of the minimum value can now be written as follows (cf. (B5)):

$$f_{min\{x_{pTotal}^0(t')\}_{s \in [t-T_{Log},s]}, Y^t, min x_{pTotal}^0(t-T_{Log})}(x), \tag{B8}$$

where the last quantity of (B8) denotes the initial information of the minimum value. In the following Bayes rule and the definition of conditional mean, for probability distributions, are used extensively.

Then apply Bayes rule and the definition of conditional probability to (B8) using the definitions:

$$A := min\{x_{pTotal}^0(t')\}_{t' \in [t-T_{Log},t]}$$

$$B := min\, x_{pTotal}^0(t-T_{Log})$$

$$C := Y^t$$

The following chain of equalities then holds, using Bayes rule, the definition of conditional probability distributions, and the result $f_{B,C|A}(x,y)=f_{(B|A),(C|A)}(x,y)$ (the latter result is easily checked by the drawing of a three-circle diagram):

$$f_{A,B,C}(x) = \frac{f_{B,C|A}(x,y)f_A(x)}{f_{B,C}(x,y)} \quad (B9)$$

$$= \frac{f_{(B|A),(C|A)}(x,y)f_A(x)}{f_{B,C}(x,y)}$$

$$= \frac{f_{(B|A)(C|A)}(x)f_{C|A}(y)f_A(x)}{f_{B,C}(x,y)}$$

-continued $$= \frac{f_{B,A,C}(x)f_{C|A}(y)f_A(x)}{f_{B,C}(x,y)}$$

$$= \frac{f_{B|A,C}(x)f_{A|C}(x)f_C(y)}{f_{B,C}(x,y)}.$$

The last step can again be easily verified by drawing circle diagrams. Now, according to the definitions above, the first factor of the numerator of (B9) is a prior and hence the conditioning disappears. The second factor of the numerator will be further expanded below, whereas the last factor of the numerator and the denominator can be treated as parts of a normalizing constant. Back-substitution of the definitions of A, B and C then proves the relation:

$$f_{min\{x^0_{pTotal}(t')\}_{t' \in [t-T_{Logs}]}\bigg|Y^t, min\,x^0_{pTotal}(t-T_{Log})}(x) = \quad (B10)$$

$$\frac{1}{c} f_{min\{x^0_{pTotal}(t')\}_{t' \in [t-T_{Logs}]}\bigg|Y^t}(x) f_{min\,x^0_{pTotal}(t-T_{Log})}(x).$$

One consequence of (B10) that needs to be kept in mind is that a smoothing problem is at hand. The Kalman filtering based pre-processing step treated above hence formally needs to include a Kalman smoother step. In practice, the Kalman filter is normally sufficient though.

Final Expansion of the Conditional Mean of the Minimum Power

The starting point of this subsection is equation (B10) that states that the conditional pdf (probability distribution function) is given as the product of a prior (initial value) and a measurement dependant factor. The prior is supplied by the user and should reflect the prior uncertainty regarding P. Note that whenever the sliding window is moved and a new estimate is calculated, the same prior is again applied. The prior is hence not updated in the basic setting of the estimator.

To state the complete conditional pdf some further treatment of the first factor of (B10) is needed. The error distribution $f_{\Delta P}(x)$ of (B7), together with the definitions (B5) and (B6) will be central towards this end. Further, in the calculations below, F( ) denotes a cumulative distribution, i.e. the integral of f. Pr(.) denotes the probability of an event.

The following equalities now hold for the first factor of (B10):

$$F_{min\{x^0_{pTotal}(t')\}_{t' \in [t-T_{Log},t]}\bigg|Y^t}(x) = Pr\Big(min\{x^0_{pTotal}(t')\}_{t' \in [t-T_{Log},t]} \le x \,\Big|\, Y^t\Big) \quad (B11)$$

$$= 1 - Pr\Big(min\{x^0_{pTotal}(t')\}_{t' \in [t-T_{Log},t]} > x \,\Big|\, Y^t\Big)$$

$$= 1 - Pr\begin{pmatrix} \forall t', \Delta x_{pTotal}(t'|t) > \\ x - \hat{x}^{Kalman}_{pTotal}(t'|t) \end{pmatrix}$$

$$= 1 - \prod_{t' \in [t-T_{Log},t]} \begin{pmatrix} Pr(\Delta x_{pTotal}(t'|t) > \\ x - \hat{x}^{Kalman}_{pTotal}(t'|t) \end{pmatrix}$$

$$= 1 - \prod_{t' \in [t-T_{Log},t]} \begin{pmatrix} (1 - Pr(\Delta x_{pTotal}(t'|t) \le \\ x - \hat{x}^{Kalman}_{pTotal}(t'|t))) \end{pmatrix}$$

$$= 1 - \prod_{t' \in [t-T_{Log},t]} \Big(1 - F_{\Delta x(t'|t)}(x - \hat{x}^{Kalman}_{pTotal}(t'|t))\Big).$$

The fourth equality of (B11) follows from the assumption that the Kalman smoother provides a sufficient statistics, i.e. (B5) and (B6). The last equality follows from (B7). Obviously, the most natural assumption is to use a Gaussian distribution for $F_{\Delta P(s)}$. However, (B11) actually allows other distributions as well.

The final step in the derivation of the first factor of the distribution function is to differentiate (B11), obtaining:

$$f_{min\{x^0_{pTotal}(t')\}_{t' \in [t-T_{Log},t]}}(x) = \frac{dF_{min\{x^0_{pTotal}(t')\}_{t' \in [t-T_{Log},t]}\bigg|Y^t}(x)}{dx} = \quad (B12)$$

$$\sum_{t' \in [t-T_{Log},t]} f_{\Delta x(t'|t)}(x - \hat{x}^{Kalman}_{pTotal}(t'|t))$$

$$\prod_{\substack{q \in [t-T_{Log},t] \\ q \ne t'}} \Big(1 - F_{\Delta x(t'|t)}(x - \hat{x}^{Kalman}_{pTotal}(q|t))\Big)$$

Combining with (B10), gives the end result:

$$f_{min\{x^0_{pTotal}(t')\}_{t' \in [t-T_{Log},t]}\bigg|Y^t, min\,x^0_{pTotal}(t-T_{Log})}(x) = \quad (B13)$$

$$\frac{1}{c}\Bigg(\sum_{t' \in [t-T_{Log},t]} f_{\Delta x(t'|t)}(x - \hat{x}^{Kalman}_{pTotal}(t'|t))$$

-continued $$\prod_{\substack{q \in [t-T_{Log}, t] \\ q \neq t'}} \left(1 - F_{\Delta x(t'|t)}\left(x - \hat{x}_{pTotal}^{Kalman}(q \mid t)\right)\right)$$

$$f_{min \, x_{pTotal}^0(t-T_{Log})}(x)$$

The expression may look complex. It is fortunately straightforward to evaluate since it is a one dimensional function of Gaussian and cumulative Gaussian distributions given by:

$$f_{\Delta x(t'|t)}\left(x - \hat{x}_{pTotal}^{Kalman}(t' \mid t)\right) = \frac{1}{\sqrt{2\pi} \, \sigma_{pTotal}^{Kalman}(t' \mid t)} e^{-\frac{\left(x - \hat{x}_{pTotal}^{Kalman}(t'|t)\right)^2}{2\left(\sigma_{pTotal}^{Kalman}(t'|t)\right)^2}} \quad (B14)$$

$$F_{\Delta x(t'|t)}\left(x - \hat{x}_{pTotal}^{Kalman}(t' \mid t)\right) = \int_{-\infty}^{x - \hat{x}_{pTotal}^{Kalman}(t'|t)} f_{\Delta x(t'|t)}(y) dy$$

$$= \frac{1}{2} \text{erfc}\left(-\frac{\left(x - \hat{x}_{pTotal}^{Kalman}(t' \mid t)\right)}{\sqrt{2} \, \sigma_{pTotal}^{Kalman}(t' \mid t)}\right). \quad (B15)$$

The quantities $\hat{x}_{pTotal}^{Kalman}(t'|t)$ and $\sigma_{pTotal}^{Kalman}(t'|t)$ are readily available as outputs from the Kalman smoother, or the simpler Kalman filter.

If a noise floor value is to be provided as an output, a mean value computation is performed on the output distribution.

In summary, the above derived expression can be rewritten as $$f_{min}(P_k) = \quad (B16)$$

$$\sum_{i=1}^{N_{PowerSamples}} \left( f_{PowerSample}(i, k) \prod_{\substack{j=1 \\ j \neq 1}}^{N_{PowerSamples}} (1 - F_{PowerSample}(j, k)) \right)$$

The invention claimed is:

1. A method of estimating neighbor cell interference in a node for a wireless communication system, comprising:
measuring a total uplink power per a subset of tones;
measuring an own channel power per the subset of tones, wherein the subset of tones includes at least one tone;
combining for all subsets of tones auxiliary power quantities from at least the total uplink power per subset of tones to form a total auxiliary wideband power for an entire uplink band, wherein the auxiliary power quantities model a thermal noise power floor plus a neighbor cell interference power;
recursively calculating, in the node, a thermal noise floor measure based on the total auxiliary wideband power, wherein each auxiliary power quantity comprises a mean value and a variance corresponding to a Gaussian probability distribution for each subset of tones, the Gaussian probability distribution is obtained by optimum filtering, the noise floor measure comprises a conditional probability distribution of the minimum of the total auxiliary power, dividing is performed by a transformation of the conditional probability distribution of the minimum of the total auxiliary power, and the transformation is based on the bandwidth of each subset of tones; and
dividing the calculated noise floor measure into sub noise floor measures for each subset of tones based on a bandwidth of each subset of tones to obtain a neighbor cell interference measure for each subset of tones from at least the sub noise floor measures.

2. The method of claim 1, wherein obtaining a neighbor cell interference measure includes determining a probability distribution of the neighbor cell interference power for each subset of tones according to a difference distribution between the auxiliary power quantity and the divided sub noise floor measures, both for each subset of tones.

3. The method of claim 2, further comprising calculating an optimal estimate of the neighbor cell interference as a conditional mean.

4. The method of claim 3, further comprising calculating an optimal estimate of the variance of the neighbor cell interference as a conditional variance.

5. The method of claim 1, further comprising calculating an optimal estimate of the thermal noise floor as a conditional mean of the probability distribution.

6. A method of estimating neighbor cell interference in a node for a wireless communication system, comprising:
measuring a total uplink power per a subset of tones;
measuring an own channel power per the subset of tones, wherein the subset of tones includes at least one tone;
combining for all subsets of tones auxiliary power quantities from at least the total uplink power per subset of tones to form a total auxiliary wideband power for an entire uplink band, wherein the auxiliary power quantities model a thermal noise power floor plus a neighbor cell interference power;
recursively calculating, in the node, a thermal noise floor measure based on the total auxiliary wideband power, wherein the thermal noise floor measure corresponds to a conditional probability distribution of a noise floor measure and wherein recursive calculation of the conditional probability distribution of the noise floor measure is based on a previously calculated conditional probability distribution of the noise floor measure, a previously calculated product of complements of a previously calculated cumulative error distribution of the auxiliary power quantity, and a new probability distribution for the auxiliary power quantity; and
dividing the calculated noise floor measure into sub noise floor measures for each subset of tones based on a bandwidth of each subset of tones to obtain a neighbor cell interference measure for each subset of tones from at least the sub noise floor measures.

7. The method of claim 6, wherein recursive calculation of the conditional probability distribution of the noise floor measure is based on recursively calculating the computed product of complements of a previously computed cumulative error distribution of the auxiliary power quantity.

8. The method of claim 7, wherein recursively calculating the conditional probability distribution of the noise floor measure comprises:
calculating a present product of complements of the cumulative error distribution of the auxiliary power quantity as a product of a previously computed product of complements of the cumulative error distribution of the auxiliary power quantity and a first factor based on a new complement of the cumulative probability distribution for the auxiliary power quantity; and
calculating the conditional probability distribution of the noise floor measure as a sum of a first term and a second term, the first term being a product of the previously computed product of complement of the cumulative error distribution of the auxiliary power quantity and a second factor based on a new probability distribution for the auxiliary power quantity, and the second term being a product of the previously computed conditional probability distribution of the noise floor measure and a the first factor.

9. The method of claim 8, wherein recursively calculating the conditional probability distribution of the noise floor measure is performed according to:

$$f_{min}(t_{N+1}, x) = f_{\Delta x(t_{N+1}|t_{N+1})}\left(x - \hat{x}_{pTotal}^{Kalman}(t_{N+1} \mid t_{N+1})\right)\Gamma(t_N, x) +$$
$$\left(1 - F_{\Delta x(t_{N+1}|t_{N+1})}\left(x - \hat{x}_{pTotal}^{Kalman}(t_{N+1} \mid t_{N+1})\right)\right)f_{min}(t_N, x),$$
$$\Gamma(t_{N+1}, x) = \left(1 - F_{\Delta x(t_{N+1}|t_{N+1})}\left(x - \hat{x}_{pTotal}^{Kalman}(t_{N+1} \mid t_{N+1})\right)\right)\Gamma(t_N, x),$$

where $t_N$ is a measuring time of sample N of at least the total uplink power, x denotes discretized power, $f_{min}(t_N,x)$ denotes a probability density function of a minimum of the auxiliary power quantity at time $t_N$, $\Gamma(t_N,x)$ denotes the product of complements of the cumulative error distribution of the auxiliary power quantity, $f_{\Delta x(t_{N+1}|t_{N+1})}(x-\hat{x}_{pTotal}^{Kalman}(t_{N+1}|t_{N+1}))$ denotes an error distribution of the auxiliary power quantity at time $t_{N+1}$, and $F_{\Delta x(t_{N+1}|t_{N+1})}(x-\hat{x}_{pTotal}^{Kalman}(t_{N+1}|t_{N+1}))$ denotes a cumulative error distribution of the auxiliary power quantity at time $t_{N+1}$.

* * * * *

UNITED STATES PATENT AND TRADEMARK OFFICE
CERTIFICATE OF CORRECTION

PATENT NO. : 9,124,367 B2
APPLICATION NO. : 12/922745
DATED : September 1, 2015
INVENTOR(S) : Wingren It is certified that error appears in the above-identified patent and that said Letters Patent is hereby corrected as shown below:

In the Drawings

Figure 8A:
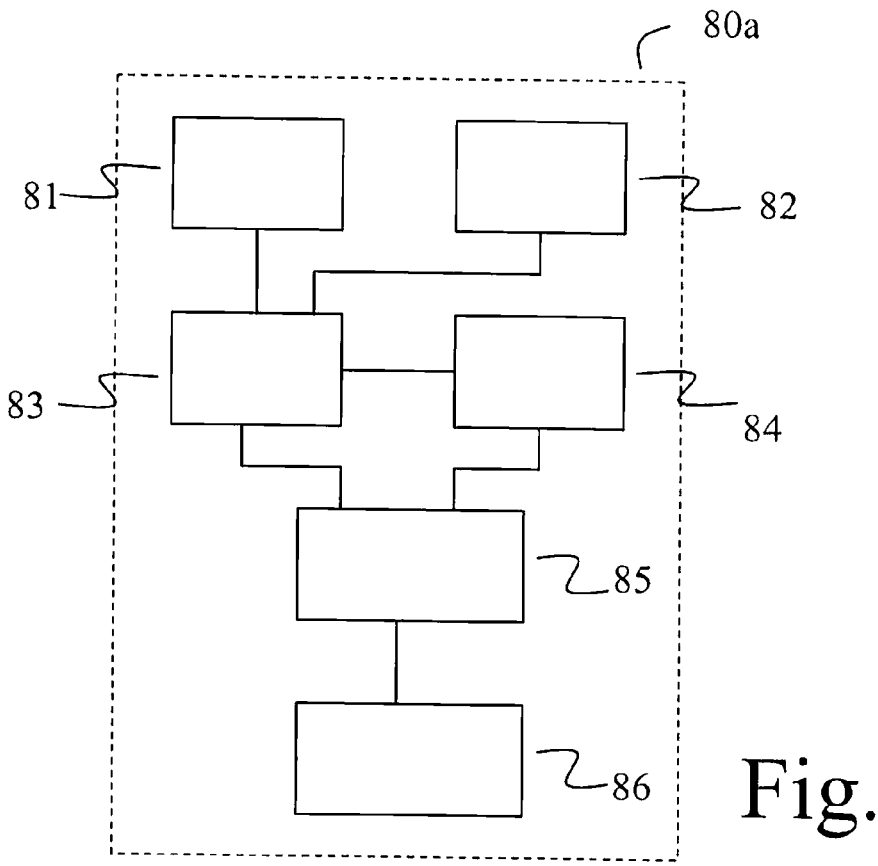
FIGS. 8a and 8b illustrate radio access network nodes according to the present invention.
Figure 8B:
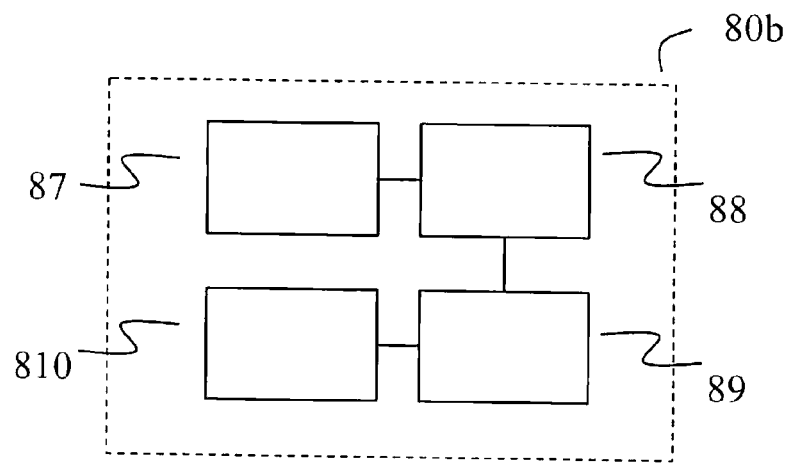

In Fig. 8b, Sheet 9 of 10, for Tag "810", delete "810" and insert -- 81 --, therefor.

In the Specification

In Column 1, Line 35, delete "own" and insert -- town --, therefor.

In Column 5, Line 31, delete "digital" and insert -- in the digital --, therefor.

In Column 9, Line 65, delete "tones" and insert -- tones $m_i$, --, therefor.

In Column 11, Lines 35-36 should read

-- $$f_{\min}(t_N, x) \equiv f_{\min\{x_{P^{Total}}^0(t')\}_{t' \leq t_N} | \mathbf{Y}^{t_N}}(x)$$ --, therefor.

In Column 13, Line 17 should read

-- $$1 - F_{\Delta x(t_{N+1}|t_{N+1})}\left(x - \hat{x}_{P^{Total}}^{Kalman}(t_{N+1} | t_{N+1})\right)$$ --, therefor.

In Column 14, Lines 39-40 should read

-- $$\Gamma(t_{N+1}, x) = \left(1 - F_{\Delta x(t_{N+1}|t_{N+1})}\left(x - \hat{x}_{P^{Total}}^{Kalman}(t_{N+1} | t_{N+1})\right)\right)^{1-\alpha} \Gamma(t_N, x)^{\alpha}$$ --, therefor.

In Column 16, Line 18, delete "i=1,..., M, denotes" and insert -- denotes --, therefor.

Signed and Sealed this
Nineteenth Day of April, 2016

Michelle K. Lee
*Director of the United States Patent and Trademark Office*

CERTIFICATE OF CORRECTION (continued)

In Column 16, Line 65 should read -- $P_{\bar{I}(m_i)}(t), i = 1,\ldots,M$ --, therefor.

In Column 18, Line 33 should read -- $f_{P^N_{\bar{I}(m_i)}}(z), i = 1,\ldots,M$ --, therefor.

In Column 18, Line 57-60 should read

-- $\hat{P}_{N,\bar{I}(m_i)}, \hat{P}^N_{\bar{I}(m_i)}, \hat{\sigma}^2_{P^N_{\bar{I}(m_i)}}, \hat{P}_{\bar{I}(m_i)}(t), \hat{\sigma}^2_{P_{\bar{I}(m_i)}} \ i = 1,\ldots,M, cellID$ (implicitly or explicitly). --, therefor.

In Column 19, Line 5 should read -- $i = 1,\ldots,M$, --, therefor.

In Column 20, Line 58, delete "quanity" and insert -- quantity --, therefor.

In Column 21, Line 1, delete "disscussion" and insert -- discussion --, therefor.

In Column 21, Line 3, delete "donate" and insert -- denote --, therefor.

In Column 21, Line 5, delete "conitional" and insert -- conditional --, therefor.

In Column 21, Line 8, delete "book" and insert -- book on --, therefor.

In Column 21, Line 17, delete "convariances," and insert -- covariances, --, therefor.

In Column 21, Line 18, delete "refered" and insert -- referred --, therefor.

In Column 21, Line 19, delete "paranthess." and insert -- parentheses. --, therefor.

In Column 21, Line 20, delete "conditional" and insert -- Conditional --, therefor.

In Column 21, Line 33, delete "useing" and insert -- using --, therefor.

In Column 21, Lines 45-49 should read

-- $\hat{x}^{Kalman}_{P^{Total}}(t' | \mathbf{Y}^t) \equiv \hat{x}^{Kalman}_{P^{Total}}(t' | \{\mathbf{y}(s)\}_{s \in [-\infty,t]})$
$= \hat{x}^{Kalman}_{P^{Total}}(t' | \{\mathbf{y}(s)\}_{s \in [t-T_{Lag},t]}, \hat{x}^{Kalman}_{P^{Total}}(t - T_{Lag} | \mathbf{Y}^{t-T_{Lag}}))$ --, therefor.

In Column 21, Line 54, delete "onloy" and insert -- only --, therefor.

In Column 21, Line 63, delete "computer" and insert -- computed --, therefor.

In Column 21, Line 64, delete "kalman" and insert -- Kalman --, therefor.

CERTIFICATE OF CORRECTION (continued)
U.S. Pat. No. 9,124,367 B2

In Column 22, Line 46 should read -- $f_{\min\{x^0_{pTotal}(t')\}_{t'\in[t-T_{Lag},t]}|\mathbf{Y}^t,\min x^0_{pTotal}(t-T_{Lag})}(x)$ --, therefor.

In Column 22, Lines 58-61 should read --
$$A := \min\{x^0_{pTotal}(t')\}_{t'\in[t-T_{Lag},t]}$$
$$B := \min x^0_{pTotal}(t-T_{Lag})$$
$$C := \mathbf{Y}^t$$
--, therefor.

In Column 23, Lines 49-52 should read --
$$f_{\min\{x^0_{pTotal}(t')\}_{t'\in[t-T_{Lag},t]}|\mathbf{Y}^t,\min x^0_{pTotal}(t-T_{Lag})}(x)$$
$$= \frac{1}{c} f_{\min\{x^0_{pTotal}(t')\}_{t'\in[t-T_{Lag},t]}|\mathbf{Y}^t}(x) f_{\min x^0_{pTotal}(t-T_{Lag})}(x).$$
--, therefor.

In Column 24, Lines 13-29 should read --
$$F_{\min\{x^0_{pTotal}(t')\}_{t'\in[t-T_{Lag},t]}|\mathbf{Y}^t}(x) = \Pr\left(\min\{x^0_{pTotal}(t')\}_{t'\in[t-T_{Lag},t]} \leq x \mid \mathbf{Y}^t\right)$$
$$= 1 - \Pr\left(\min\{x^0_{pTotal}(t')\}_{t'\in[t-T_{Lag},t]} > x \mid \mathbf{Y}^t\right)$$
$$= 1 - \Pr\left(\forall t', \Delta x_{pTotal}(t' \mid t) > x - \hat{x}^{Kalman}_{pTotal}(t' \mid t)\right)$$
$$= 1 - \prod_{t'\in[t-T_{Lag},t]} \Pr\left(\Delta x_{pTotal}(t' \mid t) > x - \hat{x}^{Kalman}_{pTotal}(t' \mid t)\right)$$
$$= 1 - \prod_{t'\in[t-T_{Lag},t]} \left(1 - \Pr\left(\Delta x_{pTotal}(t' \mid t) \leq x - \hat{x}^{Kalman}_{pTotal}(t' \mid t)\right)\right)$$
$$= 1 - \prod_{t'\in[t-T_{Lag},t]} \left(1 - F_{\Delta x(t'|t)}\left(x - \hat{x}^{Kalman}_{pTotal}(t' \mid t)\right)\right)$$
--, therefor.

CERTIFICATE OF CORRECTION (continued)

U.S. Pat. No. 9,124,367 B2

In Column 24, Lines 43-54 should read $$f_{\min\{x^0_{pTotal}(t')\}_{t'\in[t-T_{Lag},t]}|\mathbf{Y}^t}(x) = \frac{dF_{\min\{x^0_{pTotal}(t')\}_{t'\in[t-T_{Lag},t]}|\mathbf{Y}^t}(x)}{dx}$$

$$= \sum_{t'\in[t-T_{Lag},t]} f_{\Delta x(t'|t)}\left(x - \hat{x}^{Kalman}_{pTotal}(t'|t)\right) \prod_{\substack{q\in[t-T_{Lag},t]\\q\neq t'}} \left(1 - F_{\Delta x(t'|t)}\left(x - \hat{x}^{Kalman}_{pTotal}(q|t)\right)\right)$$

-- therefor.

In Column 24, Lines 60-65 and Column 25, Lines 2-8 should read $$f_{\min\{x^0_{pTotal}(t')\}_{t'\in[t-T_{Lag},t]}|\mathbf{Y}^t,\min x^0_{pTotal}(t-T_{Lag})}(x)$$

$$= \frac{1}{c}\left(\sum_{t'\in[t-T_{Lag},t]} f_{\Delta x(t'|t)}\left(x - \hat{x}^{Kalman}_{pTotal}(t'|t)\right) \prod_{\substack{q\in[t-T_{Lag},t]\\q\neq t'}} \left(1 - F_{\Delta x(t'|t)}\left(x - \hat{x}^{Kalman}_{pTotal}(q|t)\right)\right)\right) f_{\min x^0_{pTotal}(t-T_{Lag})}(x)$$

-- therefor.

In the Claims

In Column 27, Line 5, in Claim 8, delete "a the" and insert -- the --, therefor.